US012576556B2

(12) United States Patent
Luharuka et al.

(10) Patent No.: US 12,576,556 B2
(45) Date of Patent: Mar. 17, 2026

(54) HYDRATION SYSTEMS AND METHODS

(71) Applicant: SCHLUMBERGER TECHNOLOGY CORPORATION, Sugar Land, TX (US)

(72) Inventors: Rajesh Luharuka, Katy, TX (US); Hau Nguyen-Phuc Pham, Houston, TX (US); Jonathan Wun Shiung Chong, Richmond, TX (US); Miguel Angel Lopez, Missouri City, TX (US); Rod William Shampine, Houston, TX (US); Gocha G. Chochua, Sugar Land, TX (US); Mark Maher Hakim Ayyad, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 690 days.

(21) Appl. No.: 17/935,365

(22) Filed: Sep. 26, 2022

(65) Prior Publication Data

US 2023/0086438 A1     Mar. 23, 2023

Related U.S. Application Data

(63) Continuation of application No. 14/709,778, filed on May 12, 2015, now Pat. No. 11,453,146, which is a
(Continued)

(51) Int. Cl.
B29B 7/60          (2006.01)
B29B 7/40          (2006.01)
(Continued)

(52) U.S. Cl.
CPC .................. B29B 7/60 (2013.01); B29B 7/40 (2013.01); B29B 7/72 (2013.01); B29B 7/748 (2013.01);
(Continued)

(58) Field of Classification Search
CPC .... B29B 7/60; B29B 7/40; B29B 7/72; B29B 7/748; B29B 7/7485; B29B 7/693; C09K 8/66; E21B 43/26
See application file for complete search history.

(56) References Cited

U.S. PATENT DOCUMENTS 559,965 A     5/1896     Bierstadt
896,233 A     8/1908     McQueen
(Continued)

FOREIGN PATENT DOCUMENTS

CN          2601189 Y          1/2004
CN          2693601 Y          4/2005
(Continued)

OTHER PUBLICATIONS

Natural gas flow measurement, written and compiled by Long Yangming, Petroleum Industry Press, pp. 84-85, Mar. 1962.
(Continued)

*Primary Examiner* — Marc C Howell
(74) *Attorney, Agent, or Firm* — Jeffrey D. Frantz

(57)          ABSTRACT

A substantially continuous stream of aqueous fluid and a substantially continuous stream of gel having a first concentration are combined to form a substantially continuous stream of gel having a second concentration. The second concentration is substantially lower than the first concentration. The gel having the second concentration may thereafter be utilized in conjunction with a well fracturing operation.

16 Claims, 10 Drawing Sheets

Related U.S. Application Data continuation-in-part of application No. 14/536,415, filed on Nov. 7, 2014, now Pat. No. 9,457,335, and a continuation-in-part of application No. 14/192,838, filed on Feb. 27, 2014, now Pat. No. 11,819,810.

(60) Provisional application No. 61/991,685, filed on May 12, 2014.

(51) Int. Cl.

| | |
|---|---|
| *B29B 7/72* | (2006.01) |
| *B29B 7/74* | (2006.01) |
| *B29B 7/88* | (2006.01) |
| *C09K 8/66* | (2006.01) |
| *E21B 43/26* | (2006.01) |

(52) U.S. Cl.
CPC ............. *B29B 7/7485* (2013.01); *B29B 7/88* (2013.01); *C09K 8/66* (2013.01); *E21B 43/26* (2013.01); *B29B 7/402* (2013.01); *B29B 7/603* (2013.01)

(56) References Cited

U.S. PATENT DOCUMENTS

| | | | |
|---|---|---|---|
| 1,526,527 A | 2/1925 | Butler | |
| 1,560,826 A | 11/1925 | Lester | |
| 1,576,940 A | 3/1926 | Arthur | |
| 2,073,652 A | 3/1937 | Robb | |
| 2,099,898 A | 11/1937 | Larkin | |
| 2,357,583 A | 9/1944 | Franco | |
| 2,735,839 A | 2/1956 | Schrenk | |
| 2,774,497 A | 12/1956 | Martin | |
| 2,792,262 A | 5/1957 | Hathorn | |
| 2,858,950 A | 11/1958 | Martin | |
| 3,155,248 A | 11/1964 | Haller | |
| 3,170,560 A | 2/1965 | Obmascher | |
| 3,208,616 A | 9/1965 | Roy | |
| 3,263,436 A | 8/1966 | Goldfarb | |
| 3,314,557 A | 4/1967 | Sackett, Sr. | |
| 3,378,152 A | 4/1968 | Warner | |
| 3,394,961 A | 7/1968 | Gedeon | |
| 3,451,986 A | 6/1969 | Metais | |
| 3,490,632 A | 1/1970 | Mckinney | |
| 3,497,327 A | 2/1970 | Kehse | |
| 3,560,053 A | 2/1971 | Ortloff | |
| 3,618,801 A | 11/1971 | Blanchard | |
| 3,666,129 A | 5/1972 | Haskins | |
| 3,687,319 A | 8/1972 | Adam | |
| 3,743,108 A | 7/1973 | Visser | |
| 3,756,443 A | 9/1973 | Verschage et al. | |
| 3,787,479 A | 1/1974 | Grehl | |
| 3,842,910 A | 10/1974 | Zingg et al. | |
| 3,883,019 A | 5/1975 | Hansen, Jr. | |
| 3,883,148 A | 5/1975 | Miller | |
| 3,894,645 A | 7/1975 | Verschage | |
| 3,938,673 A | 2/1976 | Perry, Jr. | |
| 3,974,602 A | 8/1976 | Pohl et al. | |
| 3,985,254 A | 10/1976 | Grandury | |
| 3,998,433 A | 12/1976 | Iwako | |
| 4,026,441 A | 5/1977 | Jones | |
| 4,077,612 A | 3/1978 | Ricciardi | |
| 4,079,150 A | 3/1978 | Beck et al. | |
| 4,090,623 A | 5/1978 | Noyon | |
| 4,099,005 A * | 7/1978 | Fullington | B01F 23/50 |
| | | | 544/190 |
| 4,103,793 A | 8/1978 | Weaver | |
| 4,111,314 A | 9/1978 | Nelson | |
| 4,178,117 A | 12/1979 | Brugler | |
| 4,187,047 A | 2/1980 | Squifflet, Sr. | |
| 4,209,278 A | 6/1980 | Cooper et al. | |
| 4,222,498 A | 9/1980 | Brock | |
| 4,248,359 A | 2/1981 | Brock | |
| 4,249,848 A | 2/1981 | Griffin et al. | |
| 4,268,208 A | 5/1981 | Hankins et al. | |
| 4,337,014 A | 6/1982 | Farnham | |
| 4,348,146 A | 9/1982 | Brock | |
| 4,373,857 A | 2/1983 | Giles | |
| 4,375,343 A | 3/1983 | Butler | |
| 4,400,126 A | 8/1983 | Desourdy | |
| 4,427,133 A | 1/1984 | Kierbow et al. | |
| 4,453,829 A | 6/1984 | Althouse, III | |
| 4,465,420 A | 8/1984 | Dillman | |
| 4,494,903 A | 1/1985 | Badicel | |
| 4,561,821 A | 12/1985 | Dillman | |
| 4,579,496 A | 4/1986 | Gerlach | |
| 4,601,628 A | 7/1986 | Lowing | |
| 4,614,435 A * | 9/1986 | McIntire | B01F 25/743 |
| | | | 366/65 |
| 4,621,972 A | 11/1986 | Grotte | |
| 4,624,357 A | 11/1986 | Oury | |
| 4,626,166 A | 12/1986 | Jolly | |
| 4,671,665 A * | 6/1987 | McIntire | B01F 27/81 |
| | | | 96/213 |
| 4,701,095 A | 10/1987 | Berryman et al. | |
| 4,775,275 A | 10/1988 | Perry | |
| 4,808,004 A | 2/1989 | McIntire et al. | |
| 4,832,561 A | 5/1989 | Nijenhuis | |
| 4,834,542 A | 5/1989 | Sherwood | |
| 4,850,750 A | 7/1989 | Cogbill et al. | |
| 4,855,960 A | 8/1989 | Janssen et al. | |
| 4,883,363 A | 11/1989 | Pillon et al. | |
| 4,899,832 A | 2/1990 | Bierscheid, Jr. | |
| 4,907,712 A | 3/1990 | Stempin | |
| 4,917,560 A | 4/1990 | Murray et al. | |
| 4,925,358 A | 5/1990 | Cook | |
| 4,944,646 A | 7/1990 | Edwards et al. | |
| 5,006,034 A | 4/1991 | Bragg et al. | |
| 5,018,932 A | 5/1991 | Croisier | |
| 5,035,269 A | 7/1991 | Pytryga et al. | |
| 5,046,856 A | 9/1991 | McIntire | |
| 5,052,486 A | 10/1991 | Wilson | |
| 5,121,989 A | 6/1992 | Horton et al. | |
| 5,190,374 A | 3/1993 | Harms et al. | |
| 5,195,861 A | 3/1993 | Handke | |
| 5,201,498 A | 4/1993 | Akins | |
| 5,236,261 A | 8/1993 | Hagenbuch | |
| 5,339,996 A | 8/1994 | Dubbert et al. | |
| 5,362,193 A | 11/1994 | Milstead | |
| 5,382,411 A | 1/1995 | Allen | |
| 5,387,736 A | 2/1995 | Salomone et al. | |
| 5,413,154 A | 5/1995 | Hurst, Jr. et al. | |
| 5,426,137 A | 6/1995 | Allen | |
| 5,427,497 A | 6/1995 | Dillman | |
| 5,571,281 A | 11/1996 | Allen | |
| 5,667,298 A | 9/1997 | Musil et al. | |
| 5,685,416 A | 11/1997 | Bonnet | |
| 5,775,713 A | 7/1998 | Peterson et al. | |
| 5,777,234 A | 7/1998 | Kosmal | |
| 5,785,421 A | 7/1998 | Milek | |
| 5,795,062 A | 8/1998 | Johnson | |
| 5,822,930 A | 10/1998 | Klein | |
| 5,964,566 A | 10/1999 | Stewart | |
| 6,000,840 A | 12/1999 | Paterson | |
| 6,050,743 A | 4/2000 | Medinger | |
| 6,186,195 B1 | 2/2001 | Anstotz | |
| 6,186,654 B1 | 2/2001 | Gunteret, Jr. et al. | |
| 6,193,402 B1 | 2/2001 | Grimland et al. | |
| 6,286,986 B2 | 9/2001 | Grimland et al. | |
| 6,293,689 B1 | 9/2001 | Guntert, Jr. et al. | |
| 6,447,674 B1 | 9/2002 | Simon et al. | |
| 6,474,926 B2 | 11/2002 | Weiss | |
| 6,491,421 B2 | 12/2002 | Rondeau et al. | |
| 6,527,428 B2 | 3/2003 | Guntert, Jr. et al. | |
| 6,832,851 B1 | 12/2004 | von Wilcken | |
| 6,939,031 B2 | 9/2005 | Pham et al. | |
| 6,948,535 B2 | 9/2005 | Stegemoeller | |
| 7,048,432 B2 | 5/2006 | Phillippi et al. | |
| 7,104,328 B2 | 9/2006 | Phillippi et al. | |
| 7,214,028 B2 | 5/2007 | Boasso et al. | |
| 7,258,522 B2 | 8/2007 | Pham et al. | |
| 7,308,953 B2 | 12/2007 | Barnes | |
| 7,419,296 B2 | 9/2008 | Allen | |

(56) References Cited

U.S. PATENT DOCUMENTS

| | | | |
|---|---|---|---|
| 7,424,943 B2 | 9/2008 | Gausman | |
| 7,540,308 B2 | 6/2009 | Pessin et al. | |
| 7,614,451 B2 | 11/2009 | Blaschke et al. | |
| 7,703,518 B2 | 4/2010 | Phillippi et al. | |
| 7,815,222 B2 | 10/2010 | Markham | |
| 7,836,949 B2 | 11/2010 | Dykstra | |
| 7,837,427 B2 | 11/2010 | Beckel et al. | |
| 7,841,394 B2 | 11/2010 | McNeel et al. | |
| 7,845,413 B2 | 12/2010 | Shampine et al. | |
| 7,866,881 B2 | 1/2011 | El Kholy et al. | |
| 7,921,914 B2 | 4/2011 | Bruins et al. | |
| 7,926,564 B2 | 4/2011 | Phillippi et al. | |
| 7,931,088 B2 | 4/2011 | Stegemoeller et al. | |
| 8,066,955 B2 | 11/2011 | Pinchot | |
| 8,083,083 B1 | 12/2011 | Mohns | |
| 8,127,844 B2 | 3/2012 | Luharuka et al. | |
| 8,137,051 B2 | 3/2012 | Glenn et al. | |
| 8,142,134 B2 | 3/2012 | Lavoie et al. | |
| 8,146,665 B2 | 4/2012 | Neal | |
| 8,313,269 B2 | 11/2012 | Fisher et al. | |
| 8,354,602 B2 | 1/2013 | Lucas et al. | |
| 8,585,341 B1 | 11/2013 | Oren et al. | |
| 8,651,792 B2 | 2/2014 | Friesen | |
| 8,661,743 B2 | 3/2014 | Flusche | |
| 8,726,584 B1 | 5/2014 | Nolte et al. | |
| 8,734,081 B2 | 5/2014 | Stegemoeller et al. | |
| 8,834,012 B2 | 9/2014 | Case | |
| 8,926,252 B2 | 1/2015 | McIver et al. | |
| 8,931,996 B2 | 1/2015 | Friesen et al. | |
| 8,944,740 B2 | 2/2015 | Teichrob et al. | |
| 9,017,001 B1 | 4/2015 | Dueck | |
| 9,097,033 B2 | 8/2015 | Margevicius et al. | |
| 9,457,335 B2 | 10/2016 | Pham et al. | |
| 9,475,029 B2 | 10/2016 | McSpadden et al. | |
| 9,663,303 B2 | 5/2017 | Waldner et al. | |
| 9,688,178 B2 | 6/2017 | Pham | |
| 9,862,538 B2 | 1/2018 | Pham | |
| 2002/0034120 A1 | 3/2002 | Guntert, Jr. et al. | |
| 2002/0147370 A1 | 10/2002 | Hinz et al. | |
| 2003/0150494 A1* | 8/2003 | Morgan | B01F 25/421 |
| | | | 137/574 |
| 2003/0161212 A1 | 8/2003 | Neal et al. | |
| 2003/0196809 A1 | 10/2003 | Willberg et al. | |
| 2003/0202869 A1 | 10/2003 | Posch | |
| 2003/0227817 A1 | 12/2003 | Martel et al. | |
| 2004/0008571 A1 | 1/2004 | Coody et al. | |
| 2004/0209780 A1 | 10/2004 | Harris et al. | |
| 2004/0256106 A1 | 12/2004 | Phillippi et al. | |
| 2005/0028979 A1 | 2/2005 | Brannon et al. | |
| 2005/0067351 A1 | 3/2005 | Graham | |
| 2005/0091941 A1 | 5/2005 | Baird | |
| 2005/0123385 A1 | 6/2005 | Kirsch | |
| 2005/0185506 A1 | 8/2005 | Allen | |
| 2005/0201197 A1* | 9/2005 | Duell | B01F 35/2132 |
| | | | 366/136 |
| 2006/0028914 A1 | 2/2006 | Phillippi et al. | |
| 2006/0065400 A1 | 3/2006 | Smith | |
| 2006/0107998 A1* | 5/2006 | Kholy | B01F 25/3121 |
| | | | 137/3 |
| 2006/0146643 A1 | 7/2006 | Allen | |
| 2006/0289166 A1 | 12/2006 | Stromquist et al. | |
| 2007/0014653 A1 | 1/2007 | Glenn et al. | |
| 2007/0114035 A1 | 5/2007 | Parris et al. | |
| 2007/0179326 A1 | 8/2007 | Baker | |
| 2007/0201305 A1 | 8/2007 | Heilman et al. | |
| 2007/0277982 A1 | 12/2007 | Shampine et al. | |
| 2008/0008562 A1 | 1/2008 | Beckel et al. | |
| 2008/0066911 A1 | 3/2008 | Luharuka et al. | |
| 2008/0073895 A1 | 3/2008 | Herman et al. | |
| 2008/0179054 A1 | 7/2008 | McGough et al. | |
| 2008/0264641 A1* | 10/2008 | Slabaugh | B01F 23/51 |
| | | | 166/308.2 |
| 2009/0023614 A1* | 1/2009 | Sullivan | B01F 23/81 |
| | | | 507/214 |

| | | | |
|---|---|---|---|
| 2009/0078410 A1 | 3/2009 | Krenek et al. | |
| 2009/0078792 A1 | 3/2009 | Vlasak | |
| 2009/0090504 A1* | 4/2009 | Weightman | E21B 43/267 |
| | | | 166/250.01 |
| 2010/0038077 A1 | 2/2010 | Heilman et al. | |
| 2010/0071284 A1 | 3/2010 | Hagan et al. | |
| 2010/0188926 A1* | 7/2010 | Stegemoeller | B01F 23/59 |
| | | | 366/160.5 |
| 2010/0243251 A1 | 9/2010 | Luharuka et al. | |
| 2010/0243252 A1 | 9/2010 | Luharuka et al. | |
| 2010/0243255 A1 | 9/2010 | Luharuka et al. | |
| 2010/0278621 A1 | 11/2010 | Redekop | |
| 2010/0319921 A1 | 12/2010 | Eia et al. | |
| 2010/0329072 A1 | 12/2010 | Hagan et al. | |
| 2011/0003720 A1 | 1/2011 | Sullivan | |
| 2011/0026358 A1 | 2/2011 | Cheio De Oliveira et al. | |
| 2011/0061855 A1 | 3/2011 | Case et al. | |
| 2011/0063942 A1 | 3/2011 | Hagan et al. | |
| 2011/0123303 A1 | 5/2011 | Stegemoeller | |
| 2011/0127178 A1 | 6/2011 | Claussen | |
| 2011/0197536 A1 | 8/2011 | Clark | |
| 2011/0255941 A1 | 10/2011 | Friesen | |
| 2012/0024738 A1 | 2/2012 | Herman et al. | |
| 2012/0048537 A1 | 3/2012 | Rettie et al. | |
| 2012/0099954 A1 | 4/2012 | Teichrob | |
| 2012/0127820 A1 | 5/2012 | Noles, Jr. | |
| 2012/0127822 A1 | 5/2012 | Noles, Jr. | |
| 2012/0128449 A1 | 5/2012 | Fikes et al. | |
| 2012/0134772 A1 | 5/2012 | Herman et al. | |
| 2012/0167485 A1 | 7/2012 | Trevithick et al. | |
| 2012/0219291 A1 | 8/2012 | Chiku et al. | |
| 2012/0219391 A1 | 8/2012 | Teichrob et al. | |
| 2012/0255734 A1 | 10/2012 | Coli et al. | |
| 2012/0273206 A1 | 11/2012 | Zamora et al. | |
| 2012/0298210 A1 | 11/2012 | Pham et al. | |
| 2013/0105166 A1 | 5/2013 | Medvedev et al. | |
| 2013/0142601 A1 | 6/2013 | McIver et al. | |
| 2013/0150268 A1 | 6/2013 | Oldham | |
| 2013/0269735 A1 | 10/2013 | Roetzel et al. | |
| 2013/0288934 A1 | 10/2013 | Powell et al. | |
| 2013/0309052 A1 | 11/2013 | Luharuka et al. | |
| 2013/0315026 A1 | 11/2013 | Cheio De Oliveira | |
| 2013/0324444 A1 | 12/2013 | Lesko et al. | |
| 2014/0041317 A1 | 2/2014 | Pham et al. | |
| 2014/0041319 A1 | 2/2014 | Pham et al. | |
| 2014/0041322 A1 | 2/2014 | Pham et al. | |
| 2014/0044508 A1 | 2/2014 | Luharuka et al. | |
| 2014/0093339 A1 | 4/2014 | Friesen | |
| 2014/0166647 A1 | 6/2014 | Sheesley et al. | |
| 2014/0255265 A1 | 9/2014 | Kulkarni et al. | |
| 2014/0364346 A1* | 12/2014 | Weinstein | C09K 8/685 |
| | | | 507/225 |
| 2015/0044003 A1 | 2/2015 | Pham | |
| 2015/0044004 A1 | 2/2015 | Pham et al. | |
| 2015/0064077 A1 | 3/2015 | McSpadden et al. | |
| 2015/0166135 A1 | 6/2015 | Pham | |
| 2015/0166260 A1 | 6/2015 | Pham et al. | |
| 2015/0238912 A1 | 8/2015 | Luharuka et al. | |
| 2015/0238913 A1 | 8/2015 | Luharuka et al. | |
| 2015/0238914 A1 | 8/2015 | Luharuka et al. | |
| 2015/0240148 A1 | 8/2015 | Luharuka et al. | |
| 2016/0129418 A1 | 5/2016 | Pham et al. | |
| 2016/0130924 A1 | 5/2016 | Pham et al. | |
| 2017/0327309 A1 | 11/2017 | Hunter et al. | |

FOREIGN PATENT DOCUMENTS

| | | | |
|---|---|---|---|
| CN | 101434836 A | 5/2009 | |
| CN | 201317413 Y | 9/2009 | |
| CN | 201458370 U | 5/2010 | |
| CN | 201610285 U | 10/2010 | |
| CN | 202398329 U | 8/2012 | |
| CN | 202506322 U | 10/2012 | |
| CN | 203486442 U | 3/2014 | |
| CN | 103721619 A | 4/2014 | |
| CN | 204109871 U | 1/2015 | |
| EP | 0048312 A1 | 3/1982 | |
| EP | 0241056 A1 | 10/1987 | |
| EP | 2609999 A1 | 7/2013 | |

(56)        References Cited

FOREIGN PATENT DOCUMENTS

| FR | 2655007 A1 | 5/1991 |
| JP | S57-15828 | 1/1982 |
| KR | 10-0589613 B1 | 6/2006 |
| RU | 10418 | 7/1999 |
| RU | 2228842 C2 | 5/2004 |
| SU | 1341161 A1 | 9/1987 |
| WO | 8500046 A1 | 1/1985 |
| WO | 1985000046 A1 | 1/1985 |
| WO | 2002044517 A1 | 6/2002 |
| WO | 2007022300 A3 | 7/2007 |
| WO | 2007098606 A1 | 9/2007 |
| WO | 2010070599 A1 | 6/2010 |
| WO | 2011061503 A1 | 5/2011 |
| WO | 2011088493 A1 | 7/2011 |
| WO | 2012121896 A2 | 9/2012 |
| WO | 2012166590 A1 | 12/2012 |
| WO | 2013099826 A1 | 7/2013 |
| WO | 2013134624 A1 | 9/2013 |
| WO | 2014028317 A1 | 2/2014 |

OTHER PUBLICATIONS

Fracturing technology for ultra-low permeability reservoirs, written by Ran Xinquan, Petroleum Industry Press, pp. 223-224, Feb. 2012.

"Practical Technical Manual for Dairy Product Engineer", edit by Gu Ming, pp. 605-607, China Light Industry Press, Jan. 2009.

Office Action issued in U.S. Appl. No. 14/709,798 dated Apr. 28, 2023, 25 pages.

Notice of Allowance issued in U.S. Appl. No. 14/192,838 dated Jul. 25, 2023, 10 pages.

Office Action issued in U.S. Appl. No. 18/484,668 dated Jun. 5, 2024, 46 pages.

Notice of Allowance issued in U.S. Appl. No. 14/709,798 dated Jun. 18, 2024, 10 pages.

2nd Substantive Examination issued in Mexican Patent Application No. MX/a/2016/014690 dated Nov. 23, 2022, 14 pages with English translation.

* cited by examiner

HYDRATION SYSTEMS AND METHODS

CROSS-REFERENCE TO RELATED APPLICATIONS

This application is a continuation of U.S. patent application Ser. No. 14/709,778, filed May 12, 2015, now U.S. Pat. No. 11,453,146, issued Sep. 27, 2022, which claims priority to and the benefit of U.S. Provisional Application No. 61/991,685 entitled "Continuous Gel Mixing Apparatus and Method," filed May 12, 2014, the entire disclosures of which are hereby incorporated herein by reference.

This application is also a continuation-in-part of U.S. application Ser. No. 14/192,838 entitled "Mixing Apparatus with Stator and Method," filed Feb. 27, 2014, the entire disclosure of which is hereby incorporated herein by reference.

This application is also a continuation-in-part of U.S. application Ser. No. 14/536,415, entitled "Hydration Apparatus and Method," filed Nov. 7, 2014, now U.S. Pat. No. 9,457,335, issued Oct. 4, 2016, the entire disclosure of which is hereby incorporated herein by reference.

BACKGROUND OF THE DISCLOSURE

High viscosity fluid mixtures or gels comprising hydratable material and/or additives mixed with water and/or other hydrating fluid are utilized in fracturing and other subterranean well treatment operations. These high viscosity fluid mixtures are formulated at the wellsite or transported to the wellsite from a remote location. Hydration is a process by which the hydratable material solvates, absorbs, and/or otherwise reacts with hydrating fluid to create the high viscosity fluid mixture. The level of hydration of the hydratable material may be increased by maintaining the hydratable material in the hydrating fluid during a process step referred to as residence time, such as may take place in one or more hydration tanks.

Hydration and the associated increase in viscosity take place over a time span corresponding to the residence time of the hydratable material in the hydrating fluid. Hence, the rate of hydration of the hydratable material is a factor in the hydration operations, and particularly scrutinized in continuous hydration operations by which the high viscosity fluid mixture is continuously produced at the job site during the course of wellsite operations. To achieve sufficient hydration and/or viscosity, long tanks or a series of large tanks are utilized to provide the hydratable material with sufficient volume and, thus, residence time in the hydrating fluid. Such tanks are transported to or near the wellsite. For example, the hydratable material may be mixed with the hydrating fluid before being introduced into a series of tanks and, as the fluid mixture passes through the series of tanks, the hydratable material may hydrate to a sufficient degree.

A typical gravity-flow hydration tank cannot handle high concentration fluid mixture. Therefore, other tanks having large volumes are utilized to sufficiently dilute the fluid mixture to a sufficiently low viscosity to permit the fluid mixture to pass through the gravity-flow hydration tank. Hydration tanks having large volumes comprise large footprints, are difficult to transport, and/or may not be transportable.

SUMMARY OF THE DISCLOSURE

This summary is provided to introduce a selection of concepts that are further described below in the detailed description. This summary is not intended to identify indispensable features of the claimed subject matter, nor is it intended for use as an aid in limiting the scope of the claimed subject matter.

The present disclosure introduces a method that includes communicating a substantially continuous stream of gel having a first concentration, communicating a substantially continuous stream of aqueous fluid, and combining the substantially continuous streams of gel having the first concentration and aqueous fluid to form a substantially continuous stream of gel having a second concentration. The second concentration is substantially lower than the first concentration. The method may also include utilizing the gel having the second concentration in a well fracturing operation.

The present disclosure also introduces a method that includes substantially continuously feeding hydratable material and hydrating fluid into a mixer, and substantially continuously operating the mixer to mix the hydratable material and the hydrating fluid to form a first substantially continuous stream. The first substantially continuous stream includes gel having a first concentration of hydratable material and a first viscosity. The method also includes substantially continuously communicating the first substantially continuous stream through an enclosed hydrator to form a second substantially continuous stream. The second substantially continuous stream includes gel having the first concentration of hydratable material and a second viscosity that is substantially greater than the first viscosity. The method also includes substantially continuously combining the second substantially continuous stream and a third substantially continuous stream to form a fourth substantially continuous stream. The third substantially continuous stream substantially includes aqueous fluid. The fourth substantially continuous stream includes gel having a second concentration of hydratable material that is substantially less than the first concentration. The method also includes utilizing gel from the fourth substantially continuous stream in a well fracturing operation.

The present disclosure also introduces an apparatus that includes a system operable to form a substantially continuous supply of gel having a first hydratable material concentration for use in a well fracturing operation. The system includes a mixer to receive and mix hydratable material and aqueous fluid to form a substantially continuous supply of gel having a second hydratable material concentration. The second hydratable material concentration is substantially higher than the first hydratable material concentration. The system also includes an enclosed tank having an internal flow path traversed by the substantially continuous supply of gel having the second hydratable material concentration during a period of time sufficient to permit a viscosity of the substantially continuous supply of gel having the second hydratable material concentration to increase to a predetermined level. The system also includes a diluter operable to dilute the substantially continuous supply of increased viscosity gel having the second hydratable material concentration to substantially continuously supply gel having the first hydratable material concentration.

These and additional aspects of the present disclosure are set forth in the description that follows, and/or may be learned by a person having ordinary skill in the art by reading the materials herein and/or practicing the principles described herein. At least some aspects of the present disclosure may be achieved via means recited in the attached claims.

BRIEF DESCRIPTION OF THE DRAWINGS

The present disclosure is understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
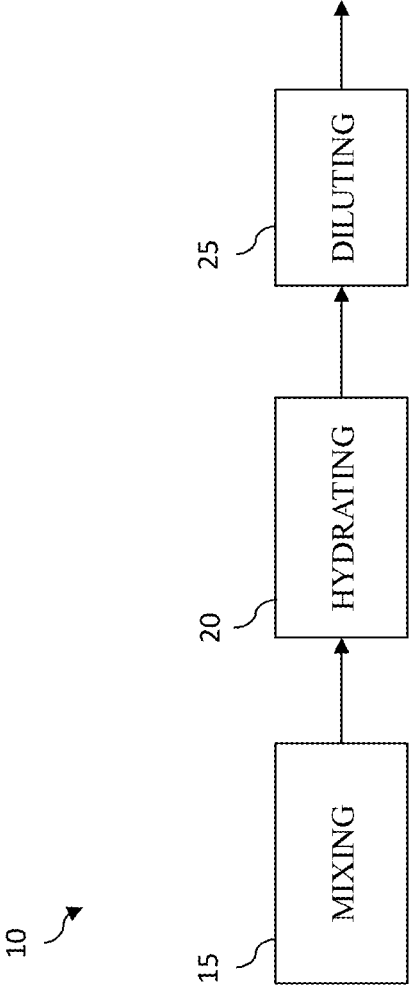
FIG. 1 is a flow-chart diagram of at least a portion of an example implementation of a method according to one or more aspects of the present disclosure.

It is to be understood that the following disclosure provides many different implementations, or examples, for implementing different features of various implementations. Specific examples of components and arrangements are described below to simplify the present disclosure. These are, of course, merely examples and are not intended to be limiting. In addition, the present disclosure may repeat reference numerals and/or letters in the various examples. This repetition is for simplicity and clarity, and does not in itself dictate a relationship between the various implementations and/or configurations discussed. Moreover, the formation of a first feature over or on a second feature in the description that follows may include implementations in which the first and second features are formed in direct contact, and may also include implementations in which additional features may be formed interposing the first and second features, such that the first and second features may not be in direct contact.

FIG. 1 is a schematic view of at least a portion of an example implementation of a method (10) for forming a fluid mixture according to one or more aspects of the present disclosure. The resulting fluid mixture may also be referred to herein as a gel.

The method (10) comprises mixing (15) a hydratable material with a hydrating fluid within a mixer at a predetermined ratio to form the fluid mixture having a first concentration of hydratable material within the hydrating fluid. Thereafter, the hydratable material is hydrated (20) within a container until a predetermined viscosity or level of hydration is reached. The hydration (20) and the associated increase in viscosity take place over a period of time during which the hydratable material is in the hydrating fluid. The hydrated (20) fluid mixture is then diluted (25) to achieve a second concentration of hydratable material within the hydrating fluid, such that the second concentration existing after the dilution (25) is substantially less than the first concentration existing after the mixing (15) and hydrating (20). The diluted (25) fluid mixture may then be communicated downstream and further processed, such as to form a fracturing fluid.

Therefore, the method (10) includes forming (via the mixing (15) and hydrating (20)) a concentrated fluid mixture having a substantially fixed or otherwise predetermined first concentration of hydratable material, and then diluting (25) the concentrated fluid mixture to form a diluted fluid mixture having a second, lower predetermined concentration of hydratable material. The first and second concentrations, and the flow rates of the fluid mixtures at the first and second concentrations, may be adjusted to meet the downstream demand. Moreover, because the concentrated fluid mixture comprises less volume than the diluted fluid mixture, the method (10) may utilize equipment having a relatively smaller volume and/or footprint than a hydration process that directly forms the diluted fluid mixture in the mixer.

The hydratable material may be or comprise a gelling agent, such as guar, a polymer, a synthetic polymer, a galactomannan, a polysaccharide, a cellulose, a clay, and/or a combination thereof, among other examples, and may be introduced into the mixer in the form of solid particles or liquid concentrate. The hydrating fluid may be or comprise water or an aqueous fluid or solution comprising water, among other examples. The resulting fluid mixture may be or comprise that which is known in the art as a gel or a slurry.

Although the methods and the apparatuses within the scope of the present disclosure describe mixing hydratable material with hydrating fluid to form a gel or slurry, it is to be understood that hydratable material may comprise various rheology modifying materials that are mixed with hydrating or other fluids to form a gel, a slurry, and/or other rheology modified fluids, such as may have high low-shear properties, but that may be shear-thinning, within the scope of the present disclosure. Hydratable material may further comprise rheology modifying materials such as polyacrylamides, fiber, nanoscale particles, dry friction reducers, dimeric and trimeric fatty acids, imidazolines, amides, and/or synthetic polymers, among other example materials that provide high viscosity at low shear rates.

Figure 2:
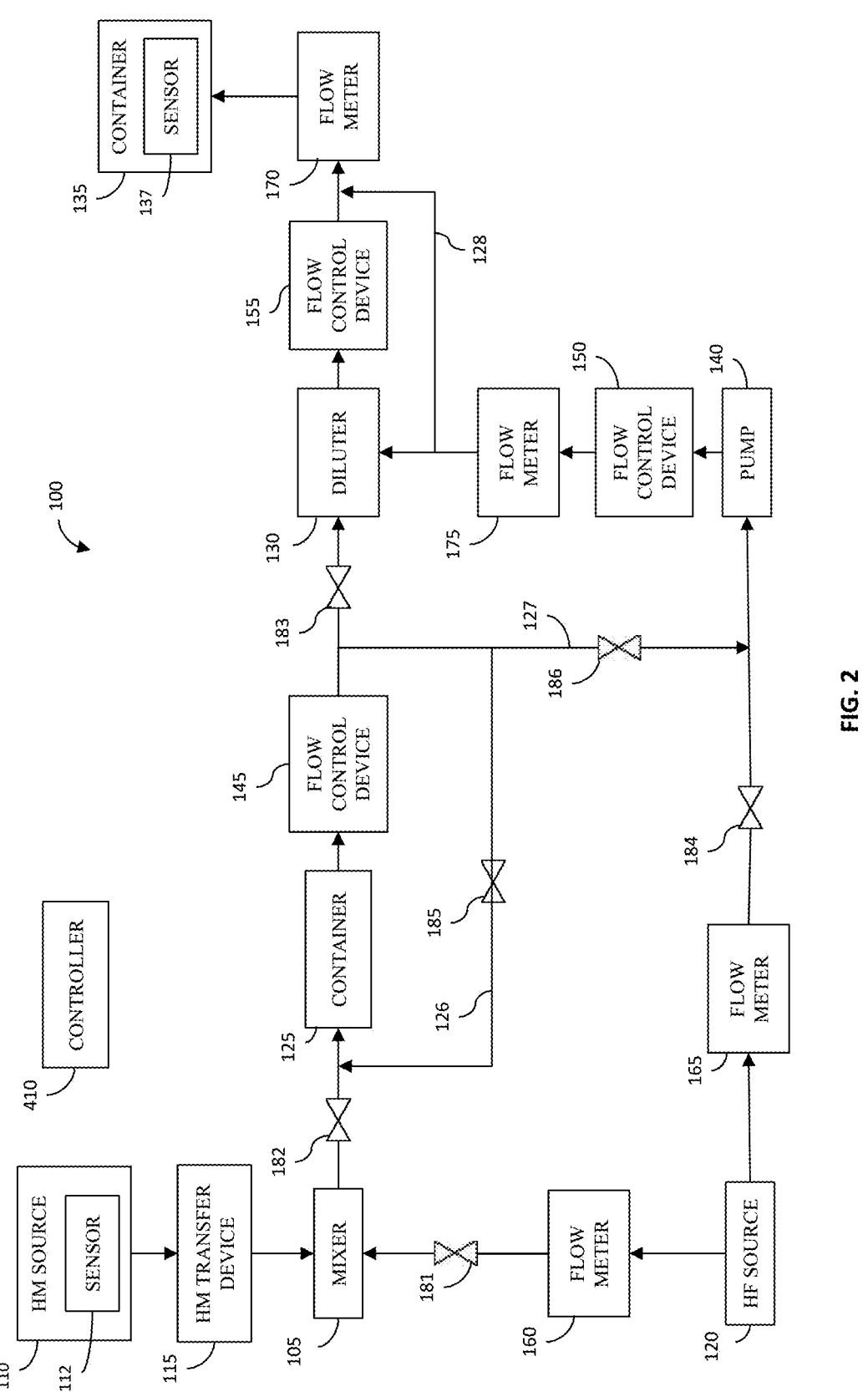
FIG. 2 is a schematic view of at least a portion of an example implementation of apparatus according to one or more aspects of the present disclosure.

FIG. 2 is a schematic view of at least a portion of an example implementation of a hydration system 100 for forming the fluid mixture via the method (10) shown in FIG. 1 and/or otherwise according to one or more aspects of the present disclosure. The hydration system 100 comprises a mixer 105 operable to receive and mix hydratable material and hydrating fluid. For example, the hydratable material may be mixed with the hydrating fluid at a rate of about 120 pounds of hydratable material per about 1000 pounds of hydrating fluid, thus forming a 120-pound fluid mixture. However, the fluid formed and discharged by the mixer 105 may have between about 80 and about 300 pounds of hydratable material per 1000 gallons of hydrating fluid, among other ratios also within the scope of the present disclosure.

The mixer 105 receives the hydratable material from a hydratable material ("HM") source 110. The hydratable material source 110 may comprise a silo, bin, hopper, and/or another container that may permit storage of the hydratable material so as to provide a substantially continuous supply of the hydratable material to the mixer 105. A lower portion of the hydratable material source 110 may have a tapered configuration terminating with a gate or other outlet permitting the hydratable material to be gravity fed and/or otherwise substantially continuously transferred into the mixer 105. The hydratable material may be continuously or intermittently transported to the hydratable material source 110 from another wellsite component, such as in implementations in which the hydratable material is transported to the hydratable material source 110 from a delivery vehicle via one or more conveyors. The hydratable material may also or instead be continuously transported from the delivery vehicle directly to the mixer 105.

The hydratable material may be metered and/or otherwise transferred to the mixer 105 via a transfer device 115. For example, if the hydratable material substantially comprises a liquid, the transfer device 115 may comprise a metering pump and/or a metering valve, such as may be operable to control the flow rate at which the hydratable material is introduced into the mixer 105.

However, if the hydratable material substantially comprises solid particles, the transfer device 115 may comprise a volumetric or mass dry metering device operable to control the volumetric or mass flow rate of the hydratable material fed from the hydratable material source 110 to the mixer 105. For example, the transfer device 115 may include a metering feeder, a screw feeder, an auger, a conveyor, and the like, and may extend between the hydratable material source 110 and the mixer 105 such that an inlet of the transfer device 115 is positioned generally below the hydratable material source 110 and an outlet is positioned generally above the mixer 105. A blade extending along a length of the transfer device 115, for example, may be operatively connected with a motor operable to rotate the blade. As the mixer 105 is operating, the rotating blade may move the hydratable material from the inlet to the outlet, whereby the hydratable material may be dropped, fed, or otherwise introduced into the mixer 105.

Although not depicted in FIG. 2, the hydration system 100 may comprise more than one hydratable material source 110 and corresponding transfer devices 115. For example, the hydration system 100 may comprise a first hydratable material source 110 storing hydratable material that substantially comprises liquid, and a second hydratable material source 110 storing hydratable material that substantially comprises solid particles. In such implementations, the transfer device 115 corresponding to the first hydratable material source 110 may comprise a metering pump and/or a metering valve, and the transfer device 115 corresponding to the second hydratable material source 110 may comprise a volumetric or mass dry metering device.

The hydratable material source 110 may comprise one or more force sensors 112, such as load cells or other sensors operable to generate information related to the mass or parameter indicative of the quantity of the hydratable material within the hydratable material source 110. Such information may be utilized to monitor the actual transfer rate of the hydratable material from the hydratable material source 110 into mixer 105, to monitor the accuracy of the transfer device 115, and/or to control the transfer rate of the hydratable material discharged from the hydratable material source 110 and/or the transfer device 115 for feeding to the mixer 105.

The hydrating fluid may be supplied to the mixer 105 from a hydrating fluid ("HF") source 120, such as may comprise a receptacle, a storage tank, a reservoir, a conduit, a manifold, and/or other component for storing and/or communicating the hydrating fluid to the mixer 105. The supplied hydrating fluid may be drawn into the mixer 105 via a suction force generated by an impeller and/or other internal component of the mixer 105. The suction force may be sufficient to communicate the hydrating fluid from the hydrating fluid source 120 to the mixer 105. However, communication of the hydrating fluid from the hydrating fluid source 120 to the mixer 105 may instead or also be facilitated by a pump (not shown), such as may be operable to pressurize and/or move the hydrating fluid from the hydrating fluid source 120 to the mixer 105.

Figure 3:
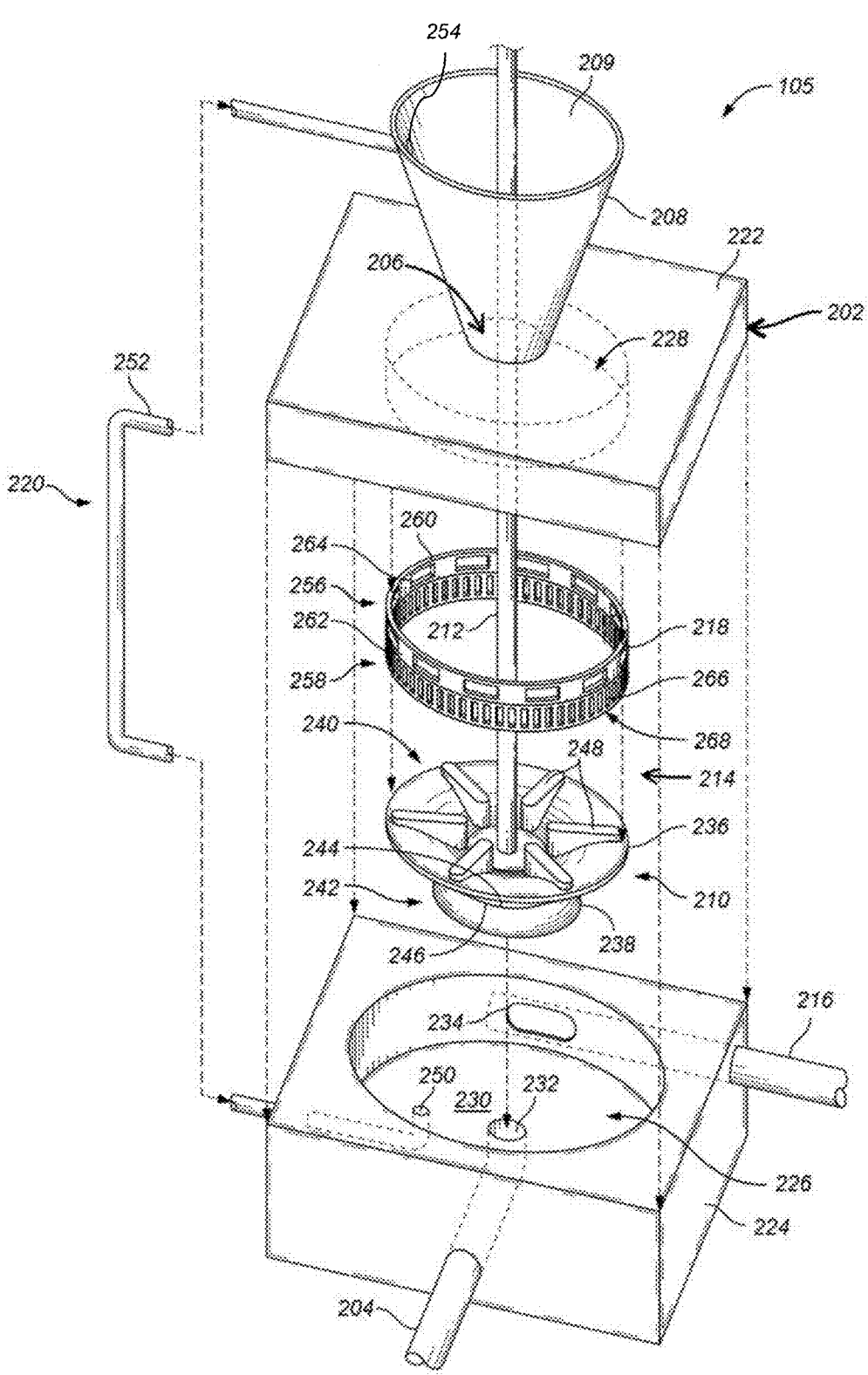
FIG. 3 is an expanded view of an example implementation of a portion of the apparatus shown in FIG. 2 according to one or more aspects of the present disclosure.

The mixer 105 is operable to mix the hydratable material and the hydrating fluid, and to pressurize the resulting fluid mixture sufficiently to pump the fluid mixture through one or more first containers 125. FIG. 3 is an expanded view of an example implementation of at least a portion of the mixer 105 according to one or more aspects of the present disclosure. The following description refers to FIGS. 2 and 3, collectively.

The mixer 105 may include a housing 202, a fluid inlet 204, and an additive inlet 206 extending into the housing 202. The fluid inlet 204 may be fluidly connected with the hydrating fluid source 120 for receiving hydrating fluid therefrom. The additive inlet 206 may generally include an additive-receiving structure 208, which may be or include a cone, chamber, bowl, hopper, or the like, having an inner surface 209 configured to receive the hydratable material from the hydratable material source 110, via the transfer device 115, and direct the hydratable material into the housing 202. It is to be understood that the hydratable material may be dry, partially dry, crystalized, fluidic, or pelletized, and/or packaged materials, perhaps including a slurry, and/or other materials to be dispersed within and/or otherwise mixed with the hydrating fluid using the mixer 105. The hydratable material received through the additive inlet 206 may also be pre-wetted, perhaps forming a partial slurry, such as to avoid fisheyes and/or material buildup.

The mixer 105 may further comprise an impeller/slinger assembly 210 driven by a shaft 212. The housing 202 may define a mixing chamber 214 in communication with the inlets 204, 206, and the impeller/slinger assembly 210 may be disposed in the mixing chamber 214. Rotation of the impeller/slinger assembly 210 may draw the hydrating fluid from the fluid inlet 204, mix the drawn hydrating fluid with the hydratable material fed from the additive inlet 206 within the mixing chamber 214, and pump the resulting mixture through the outlet 216. The outlet 216 may direct the fluid mixture through one or more fluid conduits into the first container 125.

The shaft 212 may extend upward through the inlet 206 and out of the additive-receiving structure 208 for connection with an electric motor and/or other prime mover (not shown). The shaft 212 may be connected with the impeller/slinger assembly 210 such that rotation of the shaft 212 rotates the impeller/slinger assembly 210 within the mixing chamber 214.

The mixer 105 may also include a stator 218 disposed around the impeller/stator assembly 210. The stator 218 may be in the form of a ring or arcuate portion, example details of which are described below.

The mixer 105 may further comprise a flush line 220 fluidly connected between the additive-receiving structure 208 and an area of the mixing chamber 214 that is proximal to the impeller/slinger assembly 210. The flush line 220 may tap the hydrating fluid from the mixing chamber 214 at an area of relatively high pressure and deliver it to the inner wall of the additive-receiving structure 208, which may be at a reduced (e.g., ambient) pressure. In addition to being at the relatively high pressure, the hydrating fluid tapped by the flush line 220 may be relatively "clean" (i.e., relatively low additives content, as will be described below), such as to pre-wet the additive-receiving structure 208 and promote the avoidance of clumping of the hydratable material being fed into the mixer 105. The flush line 220 may provide the pre-wetting fluid without utilizing additional pumping devices (apart from the pumping provided by the impeller/ slinger assembly 210) or additional sources of hydrating fluid or lines from the hydrating fluid source 120. One or more pumps may be provided in addition to or in lieu of tapping the hydrating fluid from the mixing chamber 214.

The housing 202 may comprise an upper housing portion 222 and a lower housing portion 224. Connection of the upper and lower housing portions 222, 224 may define the mixing chamber 214 therebetween. The lower housing portion 224 may define a lower mixing area 226, and the upper housing portion 222 may define an upper mixing area 228 (shown in phantom lines) that may be substantially aligned with the lower mixing area 226. The mixing areas 226, 228 may together define the mixing chamber 214 in which the impeller/slinger assembly 210 and the stator 218 may be disposed. The lower housing portion 224 may also include an interior surface 230 defining the bottom of the lower mixing area 226.

The upper housing portion 222 may be connected with the additive-receiving structure 208, and may provide the additive inlet 206. The lower housing portion 224 may include the fluid inlet 204, which may extend through the lower housing portion 224 to a generally centrally disposed opening 232. The opening 232 may be defined in the interior surface 230. The outlet 216 may extend to an opening 234 communicating with the lower mixing area 226.

The impeller/slinger assembly 210 may include a slinger 236 and an impeller 238. The slinger 236 and the impeller 238 may have inlet faces 240, 242, respectively, and backs 244, 246, respectively. The inlet faces 240, 242 may be each be open (as shown) or at least partially covered by a shroud (not shown), which may form an inlet in the radial inner part of the slinger 236 and/or impeller 238. The backs 244, 246 may be disposed proximal to one another and connected together, such that, for example, the impeller 238 and the slinger 236 may be disposed in a "back-to-back" configuration. Thus, the inlet face 240 of the slinger 236 may face the additive inlet 206, while the inlet face 242 of the impeller 238 may face the fluid inlet 204. Accordingly, the inlet face 242 of the impeller 238 may face the interior surface 230, and the opening 232 defined on the interior surface 230 may be aligned with a radially central portion of the impeller 238.

The slinger 236 may substantially define a saucer-shape generally having a flatter (or flat) middle portion with arcuate or slanted sides, collectively forming at least a portion of the inlet face 240. The sides may be formed, for example, as similar to or as part of a torus that extends around the middle of the slinger 236. The slinger 236 may also be bowl-shaped (e.g., generally a portion of a sphere). The slinger 236 includes six slinger blades 248 on the inlet face 240, although other numbers of blades 248 are also within the scope of the present disclosure. The blades 248 may extend radially in a substantially straight or curved manner. As the slinger 236 rotates, the hydratable material received from the inlet 206 is propelled radially outward, by interaction with the blades 248, and axially upward, as influenced by the shape of the inlet face 240.

Although obscured from view in FIG. 3, the impeller 238 may also include one or more blades on the inlet face 242. Rotation of the impeller 238 may draw hydrating fluid through the opening 232 and then expel the hydrating fluid axially downward and radially outward. Consequently, a region of relatively high pressure may develop between the lower housing portion 224 and the impeller 238, which may act to drive the hydrating fluid around the mixing chamber 214 and toward the slinger 236.

The flush line 220 may include an opening 250 defined in the lower housing portion 224 proximal to this region of high pressure. For example, the opening 250 may be defined in the interior surface 230 at a position between the outer radial extent of the impeller 238 and the opening 232 of the inlet 206. The flush line 220 may be or comprise a conduit 252 fluidly connected with an inlet 254 of the additive-receiving structure 208, for example, such that hydrating fluid is transported from the opening 250 into the additive-receiving structure 208 via the conduit 252. The hydrating fluid may then travel along a generally helical path along the inner surface 209 of the additive-receiving structure 208, as a result of the rotation of the slinger 236 and/or the shaft 212, until it travels through the additive inlet 206 to the slinger 236. Thus, the hydrating fluid received through the inlet 254 may generally form a wall of fluid along the inner surface 209 of the additive-receiving structure 208.

During operation, a pressure gradient may develop between the impeller 238 and the lower housing portion 224, with the pressure in the fluid increasing radially outward from the opening 232. Another gradient related to the concentration of the hydratable material in the hydrating fluid may also develop in this region, with the concentration of hydratable material increasing radially outward. In some cases, a high pressure head and low concentration may be intended, so as to provide a flow of relatively clean fluid through the flush line 220, propelled by the impeller/slinger assembly 210. Accordingly, the opening 250 for the flush line 220 may be disposed at a point along this region that realizes an optimal tradeoff between pressure head of the hydrating fluid and concentration of the hydratable material in the hydrating fluid received into the flush line 220.

The stator 218 may form a shearing ring extending around the impeller/slinger assembly 210 within the mixing chamber 214. For example, the stator 218 may be held generally stationary with respect to the rotatable impeller/slinger assembly 210, such as via fastening with the upper housing portion 222. However, the stator 218 may instead be supported by the impeller/slinger assembly 210 and may rotate therewith. In either example, the stator 218 may ride on the inlet face 240 of the slinger 236, or may be separated therefrom.

The stator 218 may include first and second annular portions 256, 258, which may be formed integrally or as discrete components connected together. The first annular portion 256 may minimize flow obstruction and may include a shroud 260 and posts 262 defining relatively wide slots 264, such as to permit relatively free flow of fluid therethrough. In contrast, the second annular portion 258 may maximize flow shear, such as to promote turbulent mixing. For example, the second annular portion 258 may comprise a series of stator vanes 266 that are positioned closely together, in contrast to the wide spacing of the posts 262 of the first annular portion 256. Thus, narrow flowpaths 268 may be defined between the stator vanes 266, in contrast to the wide slots 264 of the first annular portion 256.

The sum of areas of the flowpaths 268 may be less than the sum of the areas of the stator vanes 266. The ratio of the collective flow-obstructing area of the stator vanes 266 to the collective flow-permitting area of the flowpaths 268 may be about 1.5:1, for example. However, the ratio may range between about 1:2 and about 4:1, among other examples within the scope of the present disclosure. The flow-obstructing area of each stator vane 266 may be greater than the flow-permitting area of each flowpath 268.

The stator vanes 266 may be disposed at various pitch angles with respect to the circumference of the stator 218. For example, the axially extending surfaces of the stator vanes 266 may be substantially straight (e.g., substantially parallel to the diameter of the stator 218) or slanted (e.g., to increase shear), whether in or opposite the direction of rotation of the impeller/slinger assembly 210.

During mixing operations, the mixer 105 may reject air trapped in the hydratable material introduced into the mixing chamber 214, thereby forming and discharging the concentrated fluid mixture that is substantially air free or having substantially less air than the amount of air introduced into the mixing chamber 214.

Returning to FIG. 2, the mixer 105 may discharge the fluid mixture, hereinafter referred to as a concentrated fluid mixture, under pressure into the first container 125. The first container 125 may be or comprise a continuous flow channel or pathway for communicating or conveying the concentrated fluid mixture over a period of time sufficient to permit adequate hydration to occur, such that the concentrated fluid mixture may reach a predetermined level of hydration and/or viscosity. The first container 125 may have a first-in-first-out mode of operation, and may comprise a vessel-type outer housing enclosing a receptacle having an elongated flow pathway or space operable to store and communicate the concentrated fluid mixture therethrough. The first container 125 may be an enclosed container, tank, or vessel, such as may permit the concentrated fluid mixture to be pressurized at an inlet of the first container and forced through the first container 125 until the concentrated fluid mixture is discharged at an outlet of the first container 125.

The first container 125 may utilize the discharge pressure generated by the mixer as a motive force, such as may at least partially move or aid in the movement of the concentrated fluid mixture through the first container. In other words, the discharge pressure from the mixer 105 may push a viscous concentrated fluid mixture through one or more first containers 125. In an example implementation, the mixer 105 may cause a concentrated fluid mixture having about 160 pounds or more of hydratable material per 1000 gallons of hydrating fluid to move through the first container 125. The ability to hydrate the hydratable material within hydrating fluid at higher concentrations may accelerate hydration rate of the hydratable material. For example, the hydration rate may increase by about 10% or more due to handling of a higher concentration gel in the first container 125. For example, the rate of hydration may increase when handling gel that has about 80 pounds or more of hydratable material per 1000 gallons of hydrating fluid.

Figure 4:
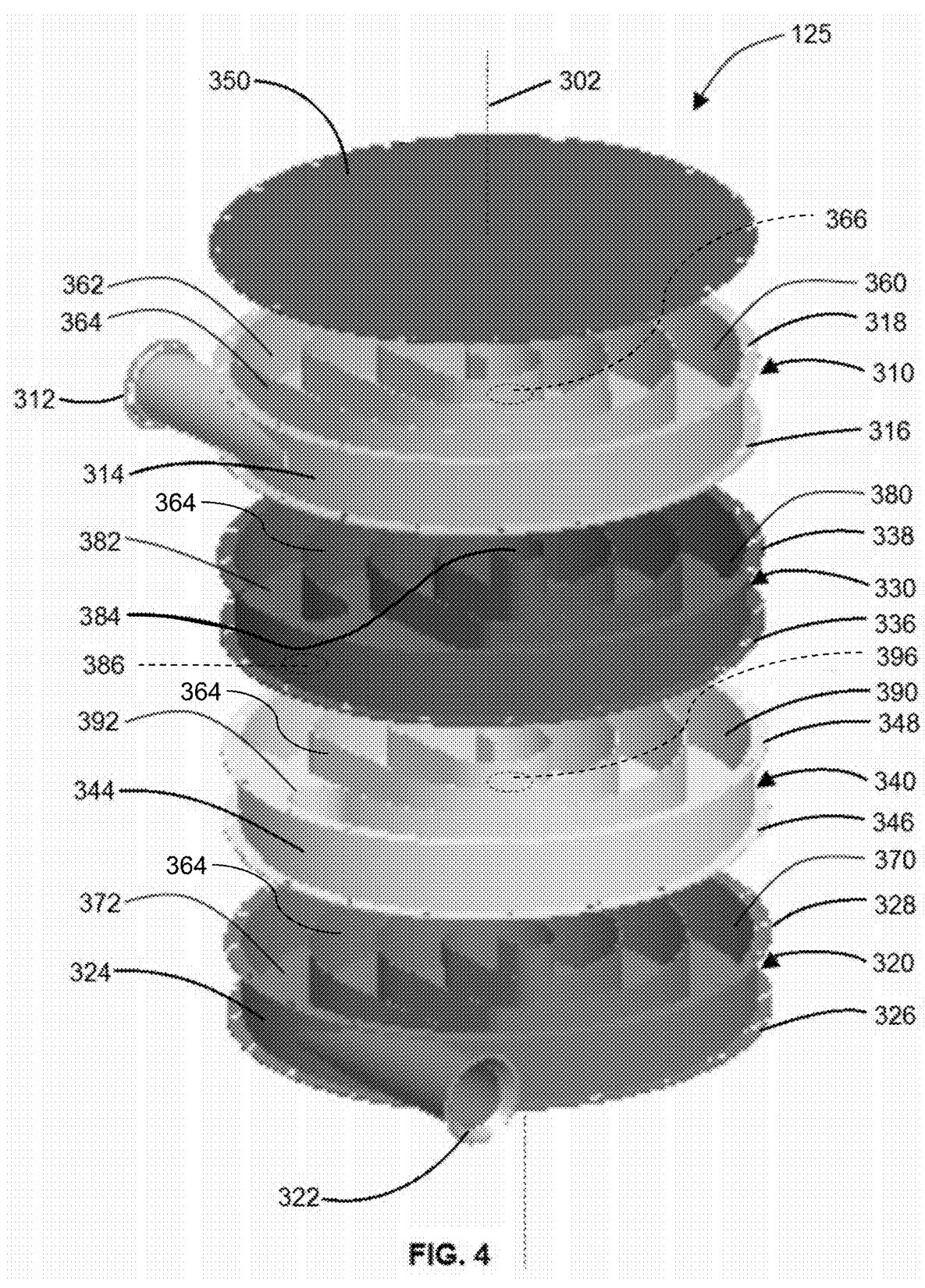
FIG. 4 is an expanded view of an example implementation of a portion of the apparatus shown in FIG. 2 according to one or more aspects of the present disclosure.

FIG. 4 is an expanded view of an example implementation of a portion of the first container 125 according to one or more aspects of the present disclosure. The first container 125 may comprise a plurality of enclosures 310, 320, 330, 340, which include a first enclosure 310, a second enclosure 320, and one or more intermediate enclosures 330, 340. The first container 125 may further comprise a first port 312 disposed on an outer wall 314 of the first enclosure 310 and operable to receive the concentrated fluid mixture, and a second port 322 disposed on an outer wall 324 of the second enclosure 320 and operable to discharge the concentrated fluid mixture. The ports 312, 322 may be flush with or extend outward from the outer walls 314, 324, including implementations in which the ports 312, 322 extend outward in a tangential direction relative to the outer walls 314, 324.

The enclosures 310, 320, 330, 340 may comprise separate chambers through which the concentrated fluid mixture may travel a distance over a time period sufficient for adequate hydration to occur. The enclosures 310, 320, 330, 340 may collectively be in fluid communication, such as may permit the concentrated fluid mixture to be introduced into the first container 125 via the first port 312, then through the first enclosure 310, through the intermediate enclosures 330, 340, through the second enclosure 320, and then discharged through the second port 322.

The first container 125 may further comprise a first plate 350 connected to the first enclosure 310, such as to confine the concentrated fluid mixture within the first enclosure 310 while passing through the first enclosure 310. The first plate 350 may be connected to the first enclosure 310 by various means, including removable fasteners attaching with a flange 318 of the first enclosure 310, welding, and/or other means, or may be formed as an integrated portion of the first enclosure 310. The enclosures 310, 320, 330, 340 may be connected with one another by same or similar means. For example, each of the enclosures 310, 320, 330, 340 may comprise a flange 316, 318, 326, 328, 336, 338, 346, 348 extending along the top and bottom of the outer walls 314, 324, 334, 344, such as for receiving threaded fasteners and/or other means for securing the enclosures 310, 320, 330, 340 with one another.

Each of the enclosures 310, 320, 330, 340 may comprise an interior space 360, 370, 380, 390. Each interior space 360, 370, 380, 390, may be or define at least one continuous fluid flow channel or other passageway 362, 372, 382, 392, respectively, each having a length greater than the circumferential length of the corresponding outer wall 314, 324, 334, 344. For example, each passageway 362, 372, 382, 392 may be defined within the corresponding interior space 360, 370, 380, 390 by a spiral or otherwise shaped wall 364. The passageways 362, 372, 382, 392 may be orientated and connected such that the first and second ports 312, 322 are in fluid communication.

For example, during hydration operations, the concentrated fluid mixture may be introduced into the first port 312, travel through the passageway 362, and exit or otherwise discharge from the first enclosure 310 at a substantially central port 366 (shown in phantom lines). The concentrated fluid mixture may then flow into the first intermediate enclosure 330 at a central end 384 of the passageway 382, travel through the passageway 382, and exit from the first intermediate enclosure 330 into the second intermediate enclosure 340 through a port 386 (shown in phantom lines) extending vertically through the first intermediate enclosure 330. The concentrated fluid mixture may then travel through the passageway 392 and exit from the second intermediate enclosure 340 into the second enclosure 320 through a port 396 (shown in phantom lines) extending vertically through the second intermediate enclosure 340. The concentrated fluid mixture may then flow though the passageway 372 and exit through the second port 322.

Although FIG. 4 show four enclosures 310, 320, 330, 340, the first container 125 may comprise one, two, three, five, or more enclosures within the scope of the present disclosure. Although FIGS. 2 and 4 show a single first container 125, additional first containers, such as between two and five containers, may be connected in parallel and/or series if, for example, additional flow rates and/or longer hydration times are intended.

Furthermore, when multiple first containers 125 are utilized, the pressure drop across each first container 125 may be detected and utilized to determine the concentration, viscosity, and/or hydration level of the concentrated fluid mixture. When multiple first containers 125 are utilized, one or more in-line shearing and/or other mixing devices may be fluidly connected between instances of the first containers 125, such as to increase the rate of hydration within the first containers 125. The concentration of the concentrated fluid mixture flowing through the multiple first containers 125 may also be staged between each first container 125, such as may permit more efficient sweep and cleanup of the concentrated fluid mixture at the end of the hydration operations.

During operation of the hydration system 100, concentration slugs may be intentionally formed within the concentrated fluid mixture such that the slugs may produce pulsing of concentration in the concentrated fluid mixture as the concentrated fluid mixture travels through the first container 125. Heat rejected from one or more components of the hydration system 100, such as engines or motors, may also be transferred to the first container 125, such as to heat the concentrated fluid mixture within the first container 125 to expedite hydration. The first container 125 may also be implemented with a gel-phobic coating or layer, such as may facilitate improved flow and decrease buildup on internal surfaces of the first container 125. The passageways 362, 372, 382, 392 and/or other portions of the first container 125 and other fluid conduits may also be purged by circulating a clean fluid (e.g., water, hydrating fluid) at velocities sufficient to create turbulence. The mixer 105, a pump 140, a first flow control device 145 (when implemented as a metering pump), an external pump, and/or other means may be utilized to circulate the clean fluid for such purging.

Figure 5:
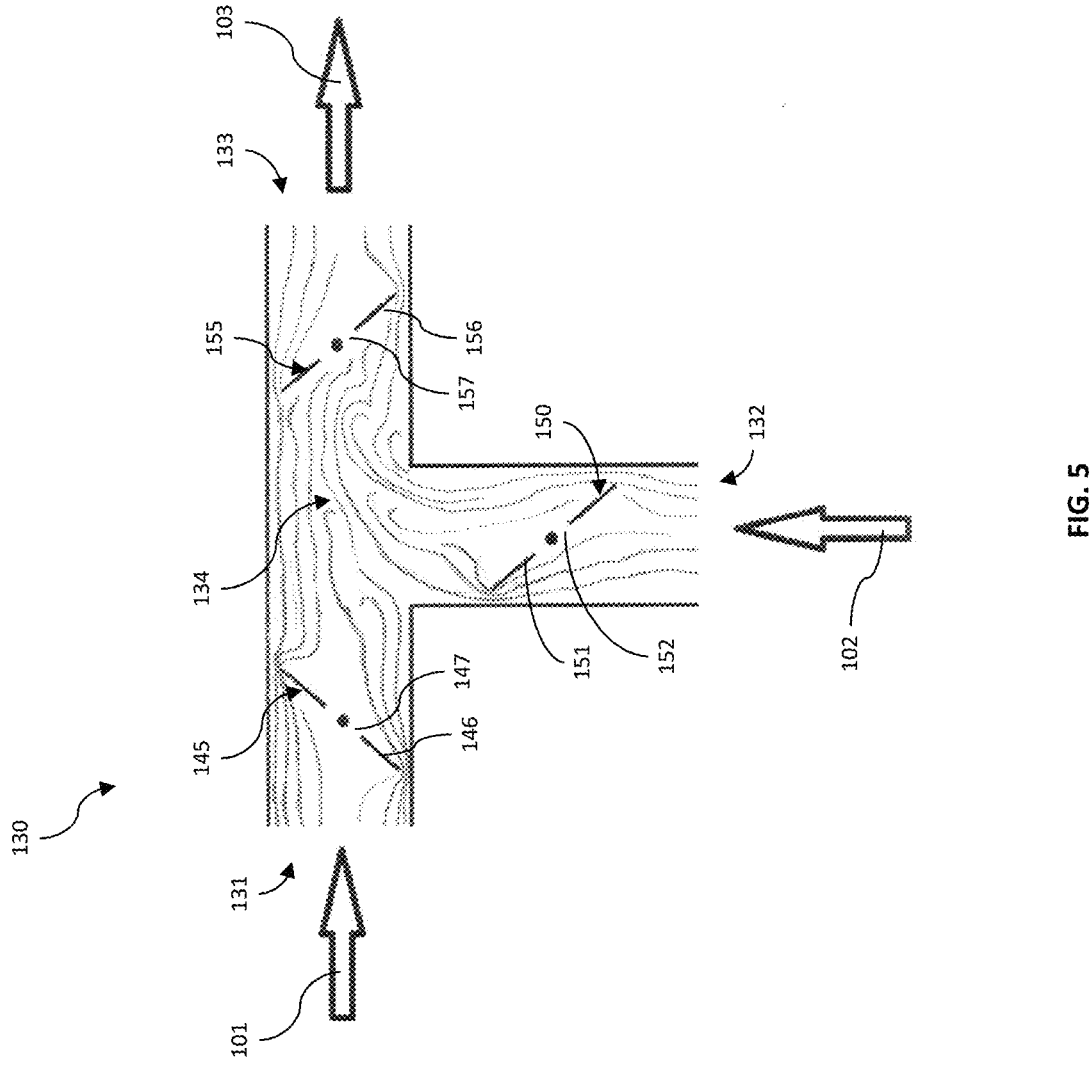
FIG. 5 is a schematic view of an example implementation of a portion of the apparatus shown in FIG. 2 according to one or more aspects of the present disclosure.

As depicted in FIG. 2, after the concentrated fluid mixture is discharged from the first container 125, the concentrated fluid mixture may comprise a predetermined level of hydration and/or viscosity and may be transferred or communicated through a diluter 130. FIG. 5 is a schematic view of an example implementation of the diluter 130 according to one or more aspects of the present disclosure.

The diluter 130 may be operable to mix or otherwise combine the concentrated fluid mixture with additional hydrating fluid or other aqueous fluid to dilute the concentrated fluid mixture or otherwise reduce the concentration of the hydratable material in the concentrated fluid mixture to a predetermined concentration level. The diluter 130 may be or comprise a fluid junction, a tee connection, a wye connection, an eductor, a mixing valve, an inline mixer, and/or another device operable to combine and/or mix two or more fluids. The diluter 130 may comprise a first passage 131 operable to receive a substantially continuous supply of concentrated fluid mixture, as indicated by arrow 101, a second passage 132 operable to receive a substantially continuous supply of hydrating fluid, as indicated by arrow 102, and a third passage 133 operable to discharge a substantially continuously supply of the diluted fluid mixture, as indicated by arrow 103. The first passage 131 may be fluidly connected with the outlet port 322 of the first container 125, such as may permit the concentrated fluid mixture to be transferred into the diluter 130. The second passage 132 may be fluidly connected with the hydrating fluid source 120, such as may permit the hydrating fluid to be transferred into the diluter 130.

The hydrating fluid may be communicated to the diluter 130 by the pump 140, which may be operable to pressurize and/or move the hydrating fluid from the hydrating fluid source 120 to the diluter 130. The pump 140 may be or comprise a centrifugal pump or another pump operable to transfer or otherwise substantially continuously move the hydratable material from the source 120 into the diluter 130. For example, the pump 140 may move the hydrating fluid from the source 120 at a flow rate ranging between about zero barrels per minute (BPM) and about 150 BPM. However, the hydration system 100 is scalable, and the pump 140 may be operable at other flow rates.

The ratio of the concentrated fluid mixture and the hydrating fluid fed to the diluter 130, which determines the concentration of the resulting diluted fluid mixture, may be controlled by adjusting a first flow control device 145, operable to control the flow of the concentrated fluid mixture into the diluter 130, and/or a second flow control device 150, operable to control the flow of the hydrating fluid into the diluter 130. For example, if the concentration of the diluted fluid mixture is selected to be decreased for use downstream, the concentration of the diluted fluid mixture may be decreased by decreasing the flow rate of the concentrated fluid mixture into the diluter 130, via operation of the first flow control device 145, and/or by increasing the flow rate of the hydrating fluid into the diluter 130, via operation of the second flow control device 150. The flow rate of the concentrated fluid mixture into the diluter 130 may be decreased by closing or otherwise reducing the flow area of the first flow control device 145, and the flow rate of the hydrating fluid into the diluter 130 may be increased by opening or otherwise increasing the flow area of the second flow control device 150. Similarly, if the concentration of the diluted fluid mixture is selected to be increased for use downstream, the concentration of the diluted fluid mixture may be increased by increasing the flow rate of the concentrated fluid mixture into the diluter 130 and/or by decreasing the flow rate of the hydrating fluid into the diluter 130. The flow rate of the concentrated fluid mixture into the diluter 130 may be increased by opening or otherwise increasing the flow area of the first flow control device 145, and the flow rate of the hydrating fluid into the diluter 130 may be decreased by closing or otherwise decreasing the flow area of the second flow control device 150. The first and second flow control devices 145, 150 may comprise various types of flow control valves, including needle valves, metering valves, butterfly valves, globe valves, or other valves operable to control the rate of fluid flow therethrough.

Each of the flow control devices 145, 150 may comprise a flow-disrupting member 146, 151, such as may be a plate having a substantially circular configuration, and perhaps having a central opening or passageway 147, 152 extending therethrough. The flow-disrupting members 146, 151 may be selectively rotatable relative to the passages 131, 132 to selectively open and close the passages 131, 132. Such rotation may be via operation of corresponding solenoids, motors, and/or other actuators (not shown).

FIG. 5 depicts the concentrated fluid mixture being introduced into the diluter 130 via the first passage 131 of the diluter 130, and the hydrating fluid being introduced into the diluter 130 via the second passage 132. However, the concentrated fluid mixture may be introduced via the second passage 132, and the hydrating fluid may be introduced via the first fluid passage 131.

In addition to or instead of the depicted flow control valve, the first flow control device 145 may comprise a metering pump operable to transfer the concentrated fluid mixture from the first container 125 to the diluter 130 at a predetermined flow rate. The metering pump may be a lobe pump, a gear pump, a piston pump, or another positive displacement pump operable to move liquids at a selected flow rate.

A third flow control device 155 may also be disposed at the discharge or downstream of the diluter 130. The third flow control device 155 may be operable to increase or decrease the output rate of the diluted fluid mixture discharged from the diluter 130 and introduced into a second container 135 of the hydration system 100. It is noted that the combination of the flow control devices 145, 150, 155 may be further operable to increase and decrease the residence time of the concentrated fluid mixture in the first container 125 and, thus, increase the level of hydration and viscosity of the concentrated fluid mixture discharged by the first container 125. For example, slower flow rates permit the concentrated fluid mixture to remain in the first container 125 for a longer period of time prior to introduction into the diluter 130 and/or the second container 135.

Similarly to the first and second flow control devices 145, 150, the third flow control device 155 may comprise a flow-disrupting member 156, such as may comprise a plate having a substantially circular configuration perhaps having a central opening or passageway 157 extending therethrough. The third flow-disrupting member 156 may be selectively rotatable relative to the third passage 133 to selectively open and close the third passage 133, perhaps in a manner similar to the selective rotation of the first and second flow-disrupting members 146, 151.

The first, second, and/or third flow-disrupting members 146, 151, 156 and/or other features of the first, second, and/or third flow control devices 145, 150, 155 may be further operable to disrupt flow or otherwise generate turbulence 134 in the flows of the concentrated fluid mixture, the hydrating fluid, and/or the diluted fluid mixture. Such turbulence 134 may provide mixing energy that may aid in dilution of the concentrated fluid mixture with the hydrating fluid to the predetermined concentration of hydratable material.

Returning to FIG. 2, the diluted fluid mixture discharged by the diluter 130 may be communicated to the second container 135, where a supply of the diluted fluid mixture is stored prior to being utilized in downhole operations or as an ingredient or portion of another fluid mixture utilized in downhole operations. The second container 135 may also permit the diluted fluid mixture to further hydrate prior to being discharged. The second container 135 may be an open or enclosed vessel or a tank comprising one or more open spaces operable to receive and contain the diluted fluid mixture. However, the second container 135 may be omitted if sufficient hydration and/or viscosity level is achieved via one or more instances of the first container 125 and/or the diluter 130. In such implementation, the diluted fluid mixture may be communicated directly downhole or utilized in another process before being injected downhole. For example, the diluted fluid mixture may be communicated to another mixer operable to mix proppants and/or other solid particulate material with the diluted fluid mixture to form a fracturing fluid or another fluid utilized in fracturing operations.

The second container 135 may comprise the same or similar structure and/or function as the first container 125, or the second container 135 may be implemented as another type of first-in-first-out vessel or tank, such as may provide additional hydration time for the diluted fluid mixture. The second container 135 may also comprise one or more level sensors 137, such as may be operable to generate signals or information related to the amount of diluted fluid mixture contained within the second container 135.

The hydration system 100 may also comprise a plurality of valves 181-186 operable to control flow of the hydrating fluid, the concentrated fluid mixture, or the diluted fluid mixture, depending on their location. The valves 181-186 may comprise ball valves, globe valves, butterfly valves, or other types of valves operable to control fluid flow therethrough. For example, a first valve 181 may be operable to control flow of the hydrating fluid to the mixer 105, a second valve 182 may be operable to control flow of the concentrated fluid mixture into the first container 125, and a third valve 183 may be operable to control flow of the concentrated fluid mixture into the diluter 130. A fourth valve 184 may be operable to control the supply of the hydrating fluid to the diluter 130, a fifth valve 185 may be operable to control the supply of the concentrated fluid mixture discharged from the flow control device 145 back to the first container 125, and a sixth valve 186 may be operable to control the supply of the concentrated fluid mixture discharged from the flow control device 145 to the pump 140.

That is, the concentrated fluid mixture may be recirculated through the first container 125 via a recirculation flow path 126 comprising one or more pipes, hoses, and/or other fluid flow conduits, such as when an excess supply of the diluted fluid mixture exists in the second container 135, or to provide additional hydration time for the concentrated fluid mixture. Accordingly, the third valve 183 may be closed and the fifth valve 185 may be opened to permit the concentrated fluid mixture to recirculate through the flow path 126 and then the first container 125. During such recirculation operations, the first flow control device 145 (when implemented as a metering pump described above), may be operable to recirculate or otherwise move the concentrated fluid mixture through the recirculation flow path 126 and the first container 125.

The concentrated fluid mixture may also be redirected through a redirected flow path 127 comprising one or more pipes, hoses, and/or other fluid flow conduits, such as for introduction to the hydrating fluid flowing between the hydrating fluid source 120 and the pump 140. The combined hydrating fluid and concentrated fluid mixture may be simultaneously transferred and mixed by the pump 140 to dilute the concentrated fluid mixture and, thus, form the diluted fluid mixture. Accordingly, the third valve 183 may be closed to prevent the concentrated fluid mixture from entering the diluter 130, and the sixth valve 186 may be opened to permit the concentrated fluid mixture to enter the fluid conduit(s) connecting the hydrating fluid source 120 and the pump 140. Thereafter, the pump 140 may transfer the diluted fluid mixture into the second container 135 as described above or via another flow path 128 comprising one or more pipes, hoses, and/or other fluid flow conduits.

The hydration system 100 may also comprise a plurality of flow meters 160, 165, 170, 175 operable to measure flow rates of selected fluids. The flow meter 160 may be disposed between the hydrating fluid source 120 and the mixer 105, such as may facilitate monitoring the flow rate of the hydrating fluid being introduced into the mixer 105. The flow meter 165 may be disposed between the hydrating fluid source 120 and the pump 140, and the flow meter 175 may be fluidly connected between the pump 140 and the diluter 130, such that one or both of the flow meters 165, 175 may facilitate monitoring the flow rate of the hydrating fluid being introduced by the pump 140 into the diluter 130. The flow meter 170 may be disposed between the diluter 130 and the second container 135, such as may facilitate monitoring the flow rate of the diluted fluid mixture being discharged from the diluter 130.

The flow meters 160, 165, 170, 175 may generate signals or information related to the corresponding fluid flow rates and communicate the signals to a controller 410. The information generated by the flow meters 160, 165, 170, 175 may be utilized by the controller 410 as a feedback signal, such as may facilitate a closed-loop control of the hydration system 100. For example, the information may be utilized to check the accuracy of the flow control devices 145, 150, 155 and/or to adjust the flow rates of the corresponding fluids, such that the concentrations and flow rates of the concentrated and diluted fluid mixtures match setpoint values, which may be predetermined, selected by a human operator, and/or determined by the controller 410 during hydration operations.

Figure 6:
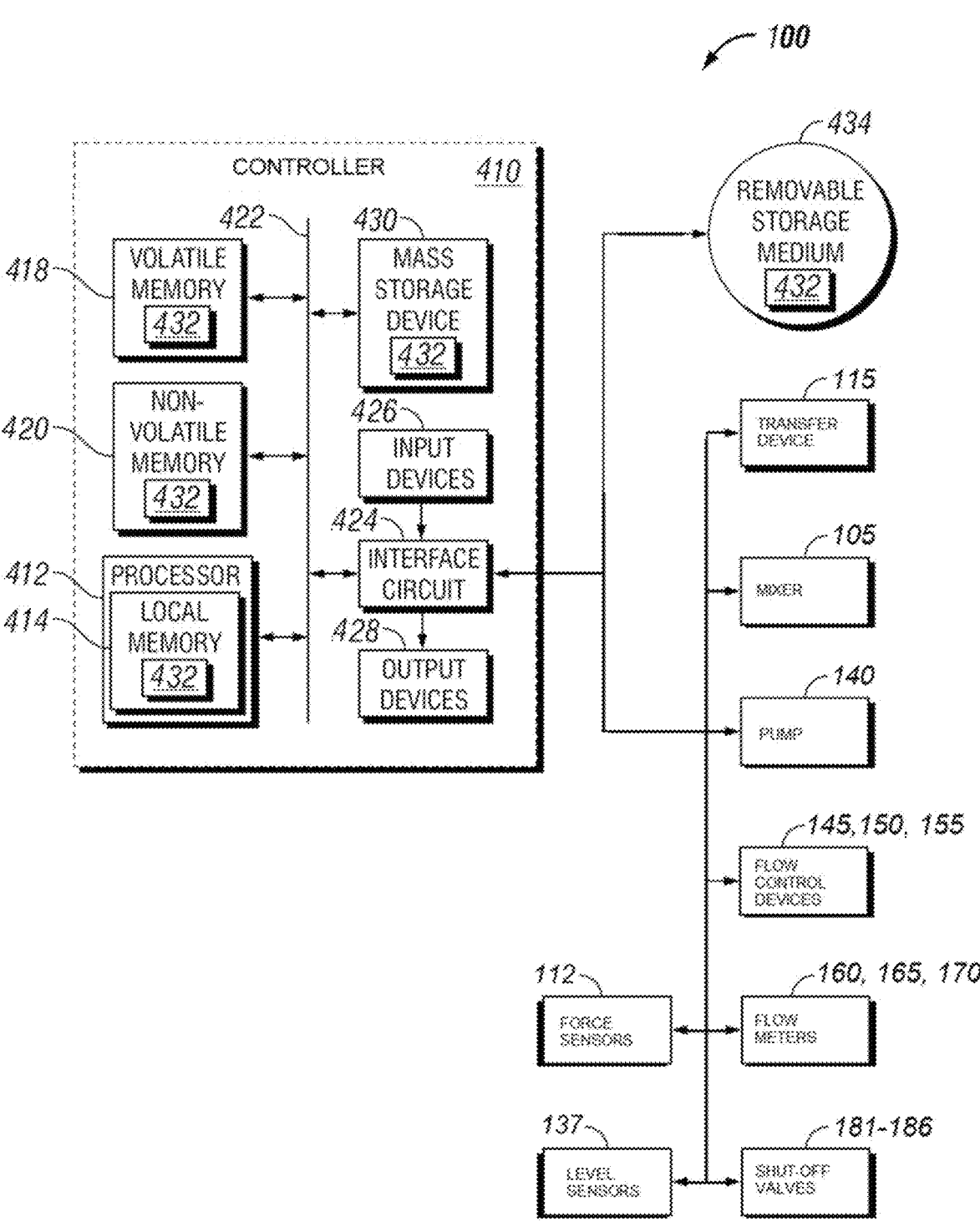
FIG. 6 is a schematic view of at least a portion of an example implementation of apparatus according to one or more aspects of the present disclosure.

FIG. 6 is a schematic view of at least a portion of an example implementation of the controller 410 in communication with the transfer device 115, the mixer 105, the pump 140, the flow control devices 145, 150, 155, the flow meters 160, 165, 170, 175, the valves 181-186, the force sensors 112, and the level sensors 137 (hereinafter referred to collectively as "hydration system components") according to one or more aspects of the present disclosure. Such communication may be via wired and/or wireless communication means. However, for clarity and ease of understanding, such communication means are not depicted in FIG. 2, and a person having ordinary skill in the art will appreciate that myriad means for such communication means are within the scope of the present disclosure.

The controller 410 may be operable to execute example machine-readable instructions to implement at least a portion of one or more of the methods and/or processes described herein, and/or to implement a portion of one or more of the example oilfield devices described herein. The controller 410 may be or comprise, for example, one or more processors, special-purpose computing devices, servers, personal computers, personal digital assistant ("PDA") devices, smartphones, internet appliances, and/or other types of computing devices.

The controller 410 may comprise a processor 412, such as a general-purpose programmable processor. The processor 412 may comprise a local memory 414, and may execute coded instructions 432 present in the local memory 414 and/or another memory device. The processor 412 may execute coded instructions 432 that, among other examples, may include machine-readable instructions or programs to implement the methods and/or processes described herein. The processor 412 may be, comprise, or be implemented by one or a plurality of processors of various types suitable to the local application environment, and may include one or more of general-purpose computers, special-purpose computers, microprocessors, digital signal processors ("DSPs"), field-programmable gate arrays ("FPGAs"), application-specific integrated circuits ("ASICs"), and processors based on a multi-core processor architecture, as non-limiting examples. Of course, other processors from other families are also appropriate.

The processor 412 may be in communication with a main memory, such as may include a volatile memory 418 and a non-volatile memory 420, perhaps via a bus 422 and/or other communication means. The volatile memory 418 may be, comprise, or be implemented by random access memory (RAM), static random access memory (SRAM), synchronous dynamic random access memory (SDRAM), dynamic random access memory (DRAM), RAMBUS dynamic random access memory (RDRAM), and/or other types of random access memory devices. The non-volatile memory 420 may be, comprise, or be implemented by read-only memory, flash memory, and/or other types of memory devices. One or more memory controllers (not shown) may control access to the volatile memory 418 and/or the non-volatile memory 420. The processor 412 may be further operable to cause the controller 410 to receive, collect, and/or record the concentration and flow setpoints and/or other information generated by the hydration system components and/or other sensors onto the main memory.

The controller 410 may also comprise an interface circuit 424. The interface circuit 424 may be, comprise, or be implemented by various types of standard interfaces, such as an Ethernet interface, a universal serial bus (USB), a third generation input/output (3GIO) interface, a wireless interface, and/or a cellular interface, among other examples. The interface circuit 424 may also comprise a graphics driver card. The interface circuit 424 may also comprise a communication device, such as a modem or network interface card, such as to facilitate exchange of data with external computing devices via a network (e.g., via Ethernet connection, digital subscriber line ("DSL"), a telephone line, a coaxial cable, a cellular telephone system, a satellite, etc.).

The hydration system components may be connected with the controller 410 via the interface circuit 424, such as may facilitate communication therebetween. For example, each of the hydration system components may comprise a corresponding interface circuit (not shown), which may facilitate communication with the controller 410. Each corresponding interface circuit may permit signals or information generated by the hydration system components to be sent to the controller 410 as feedback signals for monitoring one or more of the hydration system components, or perhaps the entirety of the hydration system 100. Each corresponding interface circuit may permit control signals to be received from the controller 410 by the various motors, drives, and/or other actuators (not shown) associated with ones of the hydration system components to control operation of the corresponding hydration system components, such as to control operation of the entirety of the hydration system 100.

One or more input devices 426 may also be connected to the interface circuit 424. The input devices 426 may permit a human operator to enter data and commands into the processor 412, such as may include a setpoint corresponding to a predetermined concentration of the hydratable material in the diluted fluid mixture (hereinafter referred to as the "concentration setpoint") and a setpoint corresponding to a predetermined flow rate of the diluted fluid mixture discharged by the hydration system 100 (hereinafter referred to as the "flow setpoint"). The input devices 426 may be, comprise, or be implemented by a keyboard, a mouse, a touchscreen, a track-pad, a trackball, an isopoint, and/or a voice recognition system, among other examples. One or more output devices 428 may also be connected to the interface circuit 424, such as to display the concentration and flow setpoints and information generated by one or more of the hydration system components. The output devices 428 may be, comprise, or be implemented by visual display devices (e.g., a liquid crystal display (LCD) or cathode ray tube display (CRT), among others), printers, and/or speakers, among other examples.

The controller 410 may also comprise one or more mass storage devices 430 and/or a removable storage medium 434, such as may be or include floppy disk drives, hard drive disks, compact disk (CD) drives, digital versatile disk (DVD) drives, and/or USB and/or other flash drives, among other examples. The information generated by the hydration system components and/or other sensors may be stored on the one or more mass storage devices 430 and/or the removable storage medium 434.

The coded instructions 432 may be stored in the mass storage device 430, the volatile memory 418, the non-volatile memory 420, the local memory 414, and/or the removable storage medium 434. Thus, components of the controller 410 may be implemented in accordance with hardware (perhaps embodied in one or more chips including an integrated circuit, such as an application specific integrated circuit), or may be implemented as software or firmware for execution by one or more processors. In the case of firmware or software, the implementation may be provided as a computer program product including a computer readable medium or storage structure embodying computer program code (i.e., software or firmware) thereon for execution by the processor 412.

The coded instructions 432 may include program instructions or computer program code that, when executed by the processor 412, cause the hydration system 100 (or at least components thereof) to perform tasks as described herein. For example, the coded instructions 432, when executed, may cause the controller 410 to receive and process the concentration and flow setpoints and, based on the setpoints, cause the hydration system 100 to form the diluted fluid mixture at the predetermined flow and having the predetermined concentration. When executed, the coded instructions 432 may cause the controller 410 to receive the information generated by hydration system components and process the information as feedback signals, such as may facilitate a closed-loop control of the hydration system 100 and/or the hydration system components. For example, the information may be processed to check the accuracy of the transfer device 115 and flow control devices 145, 150, 155, and/or to adjust the flow rates of the hydratable material and corresponding fluids, such that the flow rate of the diluted fluid mixture and the concentrations of the concentrated and diluted fluid mixtures match the flow and concentration setpoints. Although flow and concentration setpoints are discussed herein, it is to be understood that the controller 410 may receive and process other setpoints within the scope of the present disclosure. The controller 410 may also monitor and control other parameters and operations of the hydration system 100, such as may be implemented to form the diluted fluid mixture.

Figure 7:
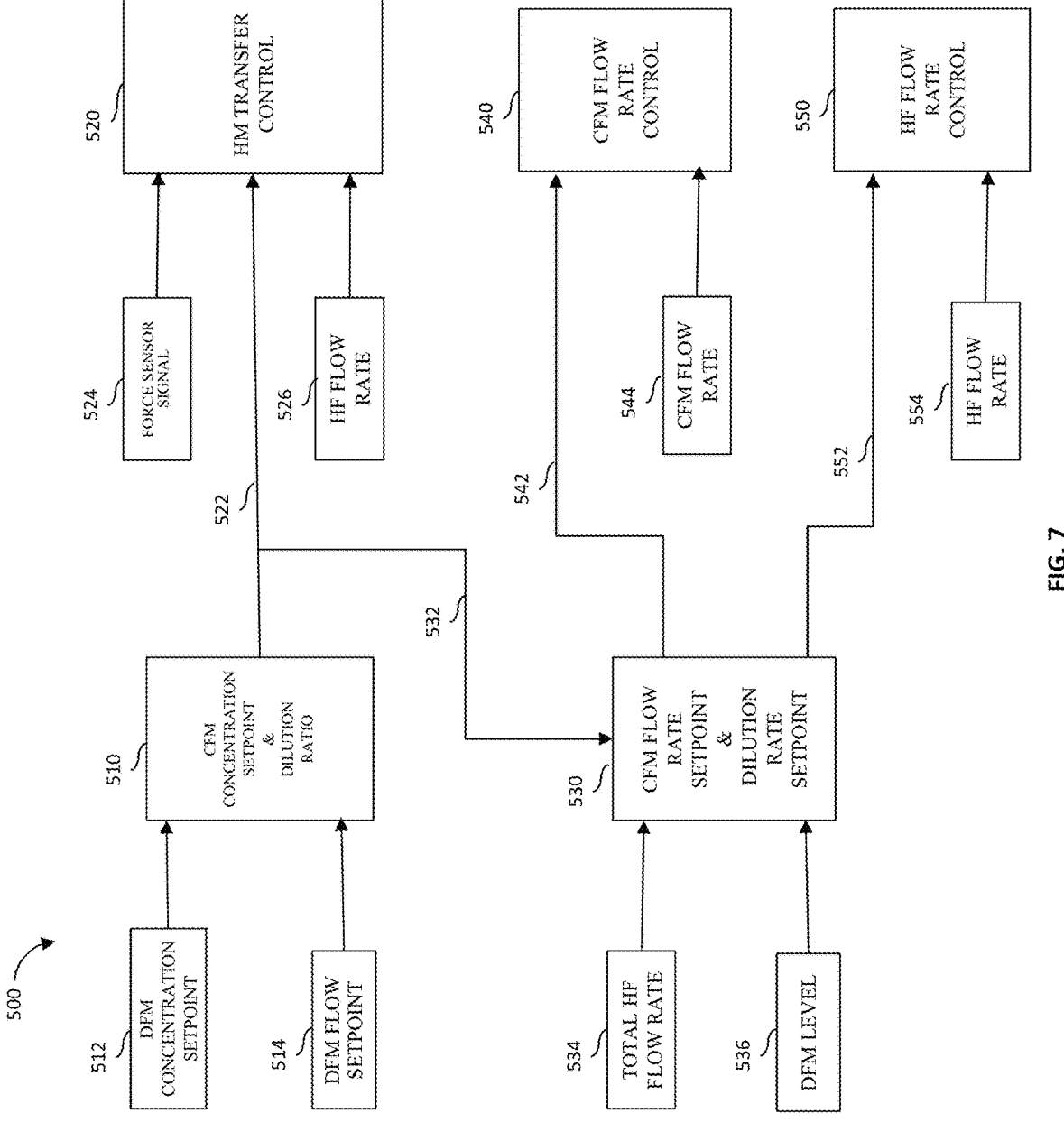
FIG. 7 is a flow-chart diagram of at least a portion of an example implementation of a method according to one or more aspects of the present disclosure.

FIG. 7 is flow-chart diagram of at least a portion of an example control process 500 stored as coded instructions 432 and executed by the controller 410 and/or one or more other controllers associated with the hydration system components according to one or more aspects of the present disclosure. The following description refers to FIGS. 2, 6, and 7, collectively.

The process 500 may be implemented by the hydration system 100 to form the diluted fluid mixture based on the predetermined concentration and flow setpoints entered into the controller 410 by a human operator. The process 500 may comprise a series of interrelated stages or sub-processes 510, 520, 530, 540, 550, wherein each such sub-process may employ a separate control loop, such as a proportional-integral-derivative (PID) control loop. For example, one or more of the sub-processes 510, 520, 530, 540, 550 may utilize a control loop to achieve an intended output or result.

The sub-processes 510, 520, 530, 540, 550 may be interrelated, as depicted by arrows 522, 532, 542, 552.

The sub-process 510 may comprise a determination of a concentrated fluid mixture ("CFM") concentration setpoint and a dilution ratio. Inputs to this sub-process may include a diluted fluid mixture ("DFM") concentration setpoint 512 (hereinafter "first setpoint") and a maximum diluted fluid mixture flow rate setpoint 514 (hereinafter "second setpoint"), which may be compared against the information generated by the flow meter 170. The first and second setpoints 512, 514 may be predetermined or selected parameters that are specific to a wellsite operation to be executed utilizing the hydration system 100, such as a hydraulic fracturing operation. The first and second setpoints 512, 514 may be entered into the controller 410 in a suitable manner, such as via the input devices 426. The setpoints 512, 514 may be determined based on other information that is relevant to the wellsite operation, such as characteristics of a subterranean formation (e.g., size, location, content, etc.) into which the diluted fluid mixture discharged by the hydration system 100 is to be injected. The controller 410 may determine and output other parameters utilized during hydration operations based on the entered first and second setpoints 512, 514 and/or other inputs. The controller 410 may then communicate the other parameters to one or more equipment controllers (not shown) associated with the hydration system components, which in turn, may implement additional sub-processes.

The sub-process 520 may comprise the control of the transfer device 115 for transferring hydratable material to the mixer 105. Inputs to the sub-process 520 may include one or more outputs (e.g., setpoints) generated by the sub-process 510, along with an actual hydrating fluid flow rate 526 into the mixer 105, as determined by the flow meter 160. Signals generated by the one or more force sensors 112, such as load cells that support the hydratable material source 110, may be utilized in the sub-process 520 to ensure that an appropriate amount of hydratable material is being introduced into the mixer 105, and/or to compare the expected amount of hydratable material with an actual amount of hydratable material introduced into the mixer 105.

The sub-process 530 may comprise the determination of the diluted fluid mixture flow rate setpoint, which includes determination of the concentrated fluid mixture flow rate setpoint and the hydrating fluid flow rate setpoint (indicated in FIG. 7 as "Dilution Rate Setpoint"). The inputs to the sub-process 530 may include one or more of the outputs generated by the sub-process 510, along with a total hydrating fluid flow rate 534 into the diluter 130, as determined by one or more of the flow meters 160, 165, 175, and a diluted fluid mixture level 536 in the second container 135, as determined by the level sensor 137.

The sub-process 540 may comprise control of the concentrated fluid mixture flow rate into the diluter 130, which may be a function of the first flow control device 145. The inputs to the sub-process 540 may include a concentrated fluid mixture flow rate setpoint 542 generated by the sub-process 530, along with an actual concentrated fluid mixture flow rate 544, as determined by the first flow control device 145 or a flow meter (not shown).

The sub-process 550 may comprise control of the hydrating fluid flow rate into the diluter 130, such as to control dilution of the concentrated fluid mixture. Inputs to the sub-process 550 may include a dilution rate setpoint 552 generated by the sub-process 530, along with a hydrating fluid flow rate 554 into the diluter 130, as determined by one or more of the flow meters 165, 175.

Figure 8:
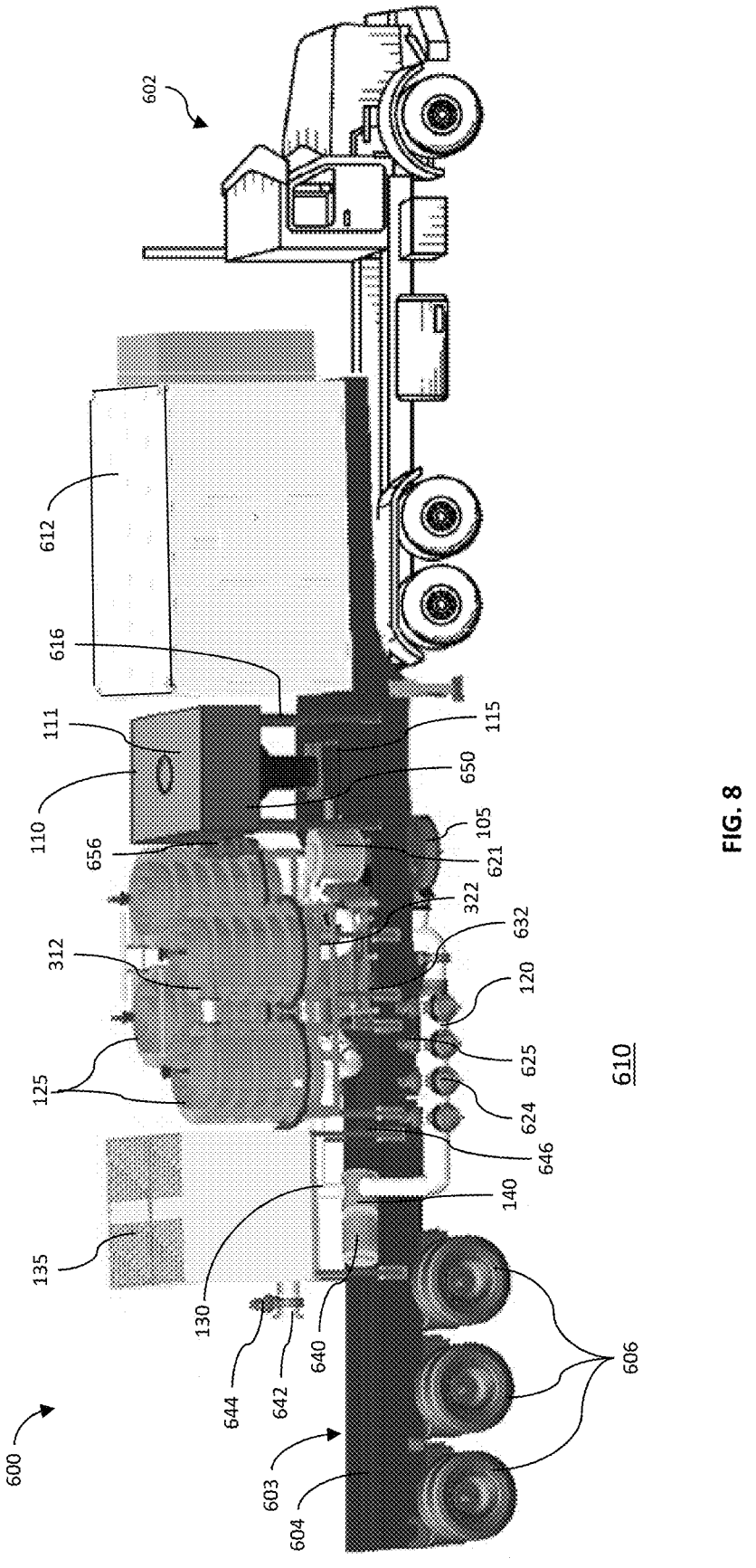
FIG. 8 is a perspective view of an example implementation of the apparatus shown in FIG. 2 according to one or more aspects of the present disclosure.

FIG. 8 is a perspective view of an example implementation of the hydration system 100 shown in FIG. 2 according to one or more aspects of the present disclosure. The hydration system 100 is depicted in FIG. 8 as being implemented as a mobile hydration system 600 detachably connected with a prime mover 602. The mobile hydration system 600 comprises a mobile carrier 603 having a frame 604 and a plurality of wheels 606 rotatably connected to the frame 604 and supporting the frame 604 on the ground 610. The mobile hydration system 600 may further comprise a control cabin 612, which may be referred to in the art as an E-house, connected with the frame 604. The control cabin 612 may comprise one or more controllers, such as the controller 410 shown in FIGS. 2 and 6, and which may be operable to monitor and control the mobile hydration system 600 as described above with respect to the hydration system 100.

The mobile hydration system 600 further comprises the hydratable material source 110, implemented as a hopper or bin operable to receive hydratable material therein. The hydratable material source 110 is connected to the frame 604 by, for example, a plurality of support members 616.

The mobile hydration system 600 further comprises the mixer 105 and the hydratable material transfer device 115, such as a screw feeder and/or other device operable to meter the hydratable material into the mixer 105. The mixer 105 is connected with the frame 604 and comprises a motor 621 operable to drive the mixer 105. The mixer 105 may be or comprise the solid-fluid mixer 105 as depicted in FIG. 3 or another mixer operable to mix or blend hydrating fluid with hydratable material. The hydrating fluid may be supplied to the mixer 105 from a hydrating fluid source 120, which is depicted in FIG. 8 as being implemented as a manifold operable to receive hydrating fluid via a plurality of ports 624. Each of the ports 624 may comprise a valve 625, such as may be operable to control the flow of hydrating fluid.

After the hydratable material and hydrating fluid are blended within the mixer 105 to form the concentrated fluid mixture, the concentrated fluid mixture may be communicated into and through one or more instances of the first container 125. The first container 125 is depicted in FIG. 8 as being implemented as four enclosed hydrating containers (hereinafter "hydrators") each comprising a substantially continuous flow pathway extending therethrough, such as the example implementation depicted in FIG. 4. Thus, each first container 125 may comprise first and second ports 312, 322 operable to receive or discharge the concentrated fluid mixture into or from each first container 125. Each first container 125 may be connected to the frame 604 by, for example, a plurality of support members 632.

After the concentrated fluid mixture is passed through each first container 125, the concentrated fluid mixture may be communicated into the second container 135, which is depicted in FIG. 8 as being implemented as a header tank. Prior to being introduced into the second container 135, additional hydrating fluid may be combined with or added to the concentrated fluid mixture via the diluter 130, which is depicted in FIG. 8 as being implemented as a piping tee. The hydrating fluid may be transferred from the hydrating fluid source 120 to the diluter 130 by the pump 140, such as a centrifugal pump driven by a motor 640. The hydrating fluid and the concentrated fluid mixture may be combined within the diluter 130 to form the diluted fluid mixture, as described above, and communicated into the second container 135. The diluted fluid mixture may be discharged from the second container 135 via an outlet port 642, which may be opened and closed with a valve 644. The second container 135 may be connected to the frame 604 by, for example, a plurality of support members 646.

Figure 9:
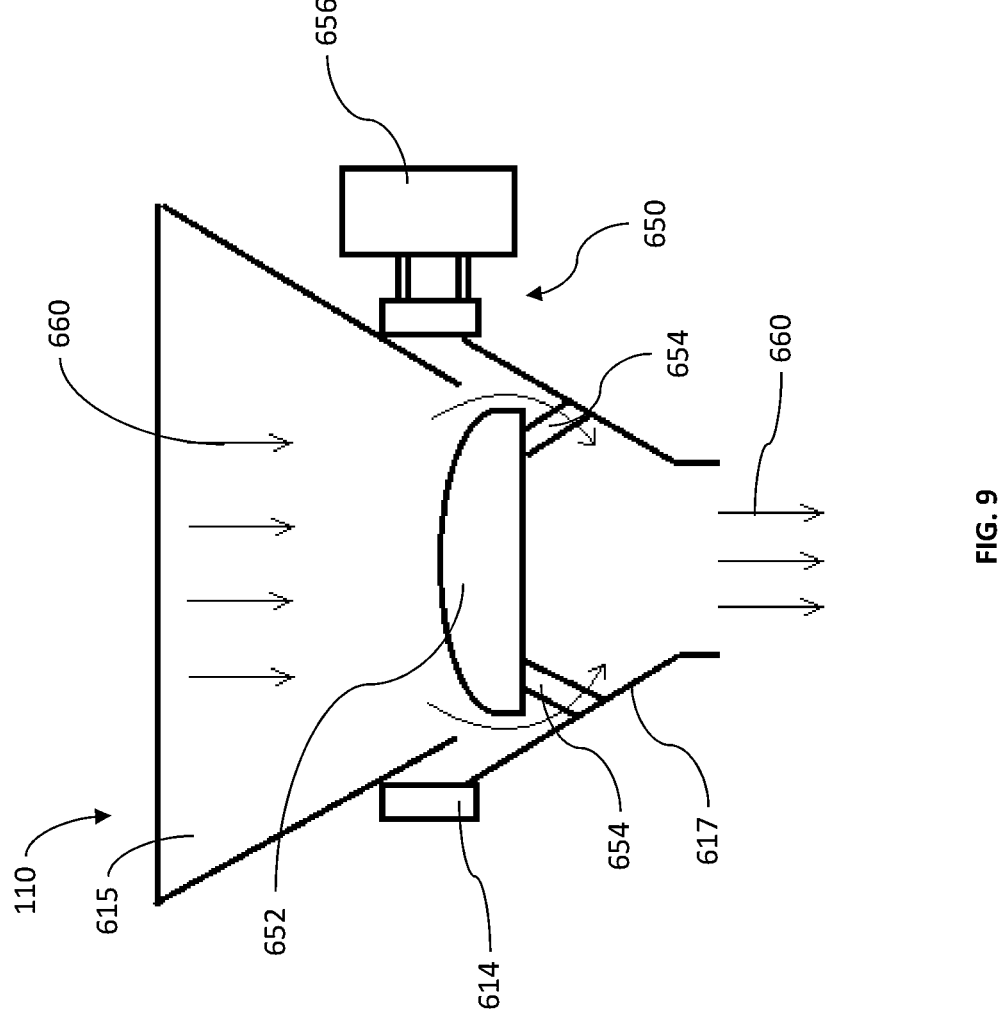
FIG. 9 is a schematic view of an example implementation of a portion of the apparatus shown in FIG. 8 according to one or more aspects of the present disclosure.

FIG. 9 is a schematic view of an example implementation of a portion of the mobile hydration system 600 shown in FIG. 8 according to one or more aspects of the present disclosure. FIG. 9 depicts the hydratable material source 110 as being implemented as comprising a substantially conical hopper section 615, and further comprising or otherwise being utilized in conjunction with an activator system 650. The activator system 650 comprises an internal baffle 652 rigidly attached to a hopper 617 and/or other component of the hydratable material source 110 by, for example, a plurality of structural members 654. The baffle 652 may be substantially conical, convex, or otherwise shaped, and may be substantially solid or have a plurality of small holes forming a sieve. A compliant membrane (not shown) may extend between a cylindrical bin section 614 and/or other portion of the activator system 650 and the conical hopper section 615 of the hydratable material source 110, such as to prevent hydratable material from passing upward around the outside of the conical hopper section 615 of the hydratable material source 110, and/or to minimize dust generation. The bin section 614, hopper 617, and/or other components of the activator system 650 may move or vibrate horizontally in response to centrifugal forces generated by a vibrator 656, such as may comprise unbalanced rotating weights therein. The vibrator 656 may be connected to the bin section 614 and/or other component of the activator system 650 by one or more clamps, threaded fasteners, and/or other means. During hydration operations, the activator system 650 may break apart clumps of hydratable material moving from the conical hopper section 615 to the hopper 617 past the baffle 652, as indicated by arrows 660. The vibration or motion generated by the activator system 650 may aid in mitigating rat-hole formation tendencies of the hydratable material being fed from the hydratable material source 110.

Table 1 set forth below lists example specifications and/or operating parameters of the mobile hydration system 600. However, Table 1 merely provides example values, and many other values are also within the scope of the present disclosure.

TABLE 1

| | |
|---|---|
| HM source 110 capacity | 4000 lb minimum |
| HM source 110 input means | 2-inch port 111 for pneumatic transfer with dust collection |
| Maximum HM transfer rate | 135 lb/min |
| HM transfer device 115 | Volumetric screw feeder and loss in weight automated calibration |
| Maximum mixing rate of mixer 105 (at 70 degrees F.) | Up to 120 BPM and 120 lb/1000 gal |
| Hydration time at maximum rate through first containers 115 | 150 seconds |
| First container 115 pressure rating | 80 pounds/in$^2$ (psi); ASME rated |
| Mixer 105 maximum operating point | 27 BPM at 55 psi discharge |

Figure 10:
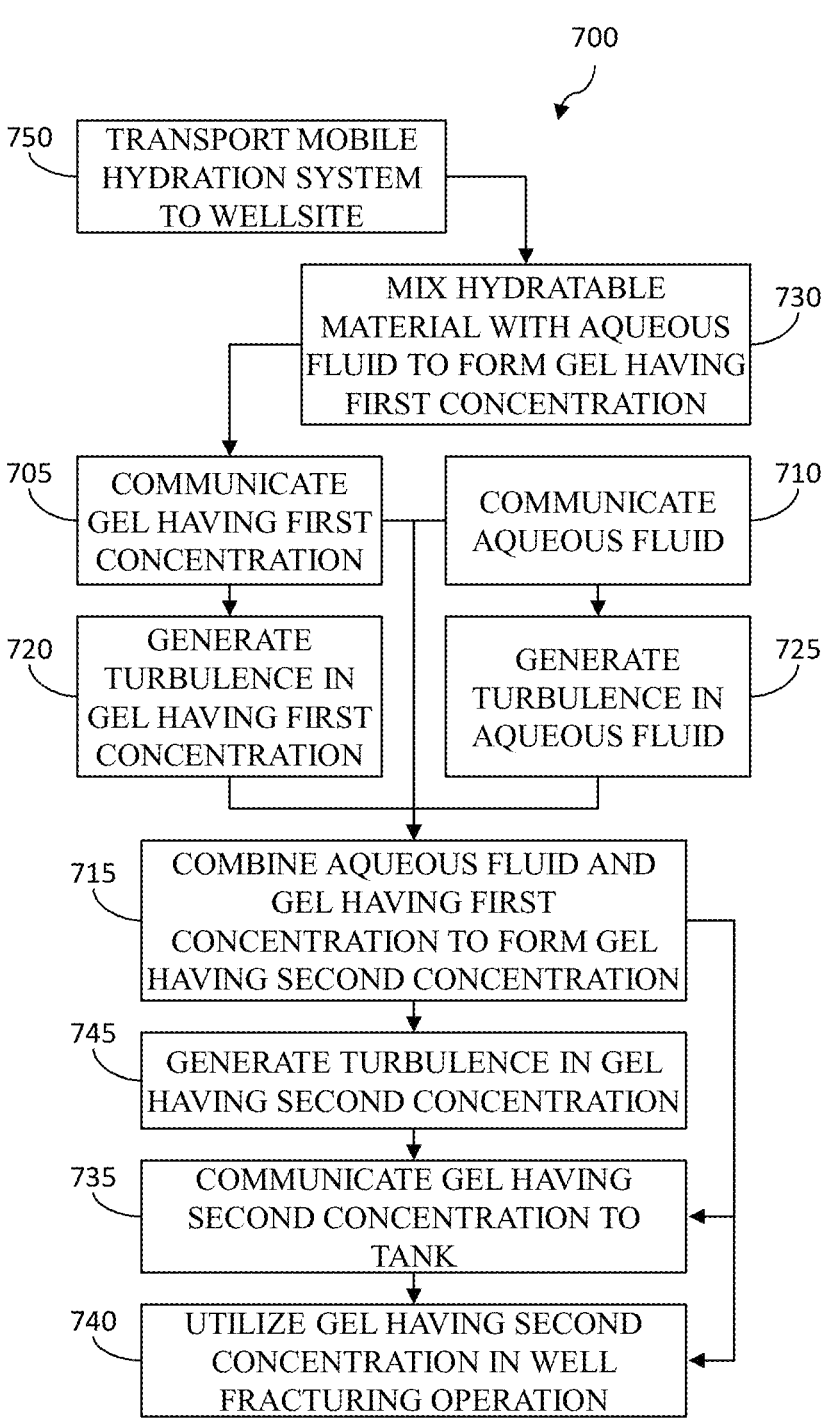
FIG. 10 is a flow-chart diagram of at least a portion of an example implementation of a method according to one or more aspects of the present disclosure.

FIG. 10 is a flow-chart diagram of at least a portion of an example implementation of a method (700) according to one or more aspects of the present disclosure. The method (700) may be performed utilizing at least a portion of one or more implementations of the apparatus shown in one or more of FIGS. 2-9 and/or other apparatus within the scope of the present disclosure. For the sake of clarity and ease of understanding, however, the following description of the method (700) depicted in FIG. 10 also collectively refers to FIGS. 2 and 8 by way of example.

The method (700) comprises communicating (705) a substantially continuous stream of gel having a first concentration. As described above, the gel may be a mixture of hydratable material and hydrating fluid. Thus, for example, such communication (705) may be via a discharge means of the mixer 105, such as the outlet 216 shown in FIG. 3, and/or one or more pipes, hoses, and/or other conduits (hereinafter collectively referred to as "conduits") fluidly connecting the mixer 105 with one or more instances of the first container 125. Such communication (705) may also or instead be through one or more instances of the first container 125, such as to permit sufficient hydration of the substantially continuous stream of gel having the first concentration. Such communication (705) may also or instead be via a discharge means of the furthest downstream instance of the first container 125 (where multiple instances of the first container 125 are utilized), such as the port 322 shown in FIG. 4, and/or one or more conduits fluidly connecting the furthest downstream instance of the first container 125 with the diluter 130. Such communication (705) may also or instead be via one or more other components shown in one or both of FIGS. 2 and 8, such as the valve 182, the flow control device 145, the valve 183, the flow path 126, the valve 185, the flow path 127, the valve 186, the pump 140, the flow control device 150, and/or one or more conduits thereof and/or therebetween.

The method (700) also comprises communicating (710) a substantially continuous stream of aqueous fluid. Such communication (710) may be via one or more of the ports 624 and/or one or more conduits fluidly connecting one or more of the ports 624 with the diluter 130. Such communication (710) may also or instead be via one or more other components shown in one or both of FIGS. 2 and 8, such as one or both of the flow meters 165, 175, the valve 184, the pump 140, the flow control device 150, and/or one or more conduits thereof and/or therebetween.

The method (700) also comprises combining (715) the substantially continuous streams of gel having the first concentration and aqueous fluid to form a substantially continuous stream of gel having a second concentration, wherein the second concentration is substantially lower than the first concentration. Such combination (715) may be via the diluter 130 and/or one or more other components and/or conduits shown in one or both of FIGS. 2 and 8.

Combining (715) the substantially continuous streams of gel having the first concentration and aqueous fluid to form the substantially continuous stream of gel having the second concentration may comprise changing the second concentration by changing at least one of: a first flow rate of the substantially continuous stream of gel having the first concentration; and a second flow rate of the substantially continuous stream of aqueous fluid. Changing the first flow rate may comprise operating one or more flow control devices, such as may include one or more of the flow control device 145, the valve 183, the valve 185, and/or the valve 186. Changing the second flow rate may also comprise operating one or more flow control devices, such as may include one or more of the valve 184, the pump 140, and/or the flow control device 150. However, changing at least one of the first and second flow rates to decrease the concentration may also or instead comprise one or more other flow control devices. Changing at least one of the first and second flow rates to decrease the concentration may comprise decreasing the first flow rate, increasing the second flow rate, or both.

The method (700) may further comprise, before combining (715) the substantially continuous streams of gel having the first concentration and aqueous fluid to form the substantially continuous stream of gel having the second concentration, generating (720) turbulence in the substantially continuous stream of gel having the first concentration. For example, if the diluter 130 is implemented as depicted in FIG. 5, and the substantially continuous stream of gel having the first concentration is introduced into the diluter 130 via the passage 131, such turbulence may be generated (720) via operation of the flow-disrupting member 146. However, implementations of the flow control device 145 other than as depicted in FIG. 5, and/or other means, may also or instead be utilized to generate (720) turbulence in the substantially continuous stream of gel having the first concentration. The generated (720) turbulence may aid in mixing, dilution, and/or hydration of the resulting mixture.

The method (700) may further comprise, before combining (715) the substantially continuous streams of gel having the first concentration and aqueous fluid to form the substantially continuous stream of gel having the second concentration, generating (725) turbulence in the substantially continuous stream of aqueous fluid. For example, if the diluter 130 is implemented as depicted in FIG. 5, and the substantially continuous stream of aqueous fluid is introduced into the diluter 130 via the passage 132, such turbulence may be generated (725) via operation of the flow-disrupting member 151. However, implementations of the flow control device 150 other than as depicted in FIG. 5, and/or other means, may also or instead be utilized to generate (725) turbulence in the substantially continuous stream of aqueous fluid. The generated (725) turbulence may aid in mixing, dilution, and/or hydration of the resulting mixture.

The method (700) may further comprise mixing (730) a substantially continuous stream of hydratable material with a substantially continuous stream of aqueous fluid to form the communicated (705) substantially continuous stream of gel having the first concentration. As described above, such mixing (730) may be performed by the mixer 105 upon receiving a substantially continuous supply of the hydratable material, such as from the hydratable material source 110 via the transfer device 115, and a substantially continuous supply of the aqueous fluid, such as from one or more of the ports 624 shown in FIG. 8 and/or the hydrating fluid source 120 shown in FIG. 2.

The method (700) may further comprise communicating (735) the substantially continuous stream of gel having the second concentration into a tank. For example, the tank may be one or more instances of the second container 135. Such communication (735) may be via a discharge means of the diluter 130 (such as the passage 133 shown in FIG. 5), the flow control device 155, and/or one or more other components or conduits fluidly connected between the diluter 130 and the second container 135.

The method (700) may further comprise utilizing (740) the gel having the second concentration in a well fracturing operation. For example, utilizing (740) the gel having the second concentration may comprise mixing the gel with proppant material, and perhaps other additives, to form a fracturing fluid, such as may be subsequently pressurized and injected downhole for fracturing a subterranean formation. Such mixing may utilize another instance of the mixer 105, and/or another type of mixer, operable to receive a substantially continuous supply of the proppant material and/or other additives and the gel having the second concentration, whether the gel is received from the diluter 130, the second container 135, and/or another component of the hydration system 100 shown in FIG. 2 and/or of the mobile hydration system 600 shown in FIG. 8.

The method (700) may further comprise, before utilizing (740) the gel having the second concentration in the well fracturing operation, generating (745) turbulence in the substantially continuous stream of gel having the second concentration. For example, if the diluter 130 is implemented as depicted in FIG. 5, and the substantially continuous stream of gel having the second concentration is discharged from the diluter 130 via the passage 133, such turbulence may be generated (745) via operation of the flow-disrupting member 156. However, implementations of the flow control device 155 other than as depicted in FIG. 5, and/or other means, may also or instead be utilized to generate (745) turbulence in the substantially continuous stream of gel having the second concentration. The generated (745) turbulence may aid in mixing, dilution, and/or hydration of the resulting mixture.

The method (700) may further comprise transporting (750) a mobile carrier to a wellsite at which the well fracturing operation is to be performed. For example, the transported (750) mobile carrier may be the mobile hydration system 600 shown in FIG. 8. Thus, the transported (750) mobile carrier may comprise the frame 604 and the plurality of wheels 606 rotatably coupled to the frame 604, and may be detachably connectable to a prime mover 602. As described above, the mixer 105, one or more instances of the first container 125 collectively forming an enclosed hydrator, and the diluter 130 are each coupled to the frame 604. In such implementations, the diluter 130 may also be referred to as a combiner operable for substantially continuously combining the substantially continuous streams of aqueous fluid and gel having the first (higher) concentration to form the substantially continuous stream of gel having the second (lower) concentration.

In view of the entirety of the present disclosure, including the claims and the figures, a person having ordinary skill in the art should readily recognize that the present disclosure introduces a method comprising: communicating a substantially continuous stream of gel having a first concentration; communicating a substantially continuous stream of aqueous fluid; combining the substantially continuous streams of gel having the first concentration and aqueous fluid to form a substantially continuous stream of gel having a second concentration, wherein the second concentration is substantially lower than the first concentration; and utilizing the gel having the second concentration in a well fracturing operation.

The method may further comprise: mixing a substantially continuous stream of hydratable material with a substantially continuous stream of aqueous fluid with a mixer to form the gel having the first concentration; and discharging the gel having the first concentration from the mixer as the substantially continuous streams of hydratable material and aqueous fluid are being mixed to form the substantially continuous stream of gel having the first concentration. The hydratable material may substantially comprise guar. The aqueous fluid may substantially comprise water.

The method may further comprise, before combining the substantially continuous streams of gel having the first concentration and aqueous fluid to form the substantially continuous stream of gel having the second concentration, communicating the substantially continuous stream of gel having the first concentration through a hydration tank to permit the substantially continuous stream of gel having the first concentration to reach a predetermined viscosity.

The method may further comprise, before utilizing the gel having the second concentration in the well fracturing operation, communicating the substantially continuous stream of gel having the second concentration into a tank.

The method may further comprise, before combining the substantially continuous streams of gel having the first concentration and aqueous fluid to form the substantially continuous stream of gel having the second concentration, generating turbulence in the substantially continuous stream of gel having the first concentration.

The method may further comprise, before combining the substantially continuous streams of gel having the first concentration and aqueous fluid to form the substantially continuous stream of gel having the second concentration, generating turbulence in the substantially continuous stream of aqueous fluid.

The method may further comprise, before utilizing the gel having the second concentration in the well fracturing operation, generating turbulence in the substantially continuous stream of gel having the second concentration.

The method may further comprise changing the second concentration by changing at least one of: a first flow rate of the substantially continuous stream of gel having the first concentration; and a second flow rate of the substantially continuous stream of aqueous fluid. Changing at least one of the first and second flow rates may comprise operating a flow control device. The flow control device may comprise a valve and/or a pump. Changing at least one of the first and second flow rates may comprise at least one of: decreasing the first flow rate to decrease the second concentration; and increasing the second flow rate to decrease the second concentration.

The present disclosure also introduces a method comprising: substantially continuously feeding hydratable material and hydrating fluid into a mixer; substantially continuously operating the mixer to mix the hydratable material and the hydrating fluid to form a first substantially continuous stream, wherein the first substantially continuous stream comprises gel having: a first concentration of hydratable material; and a first viscosity; substantially continuously communicating the first substantially continuous stream through an enclosed hydrator to form a second substantially continuous stream, wherein the second substantially continuous stream comprises gel having: the first concentration of hydratable material; and a second viscosity that is substantially greater than the first viscosity; substantially continuously combining the second substantially continuous stream and a third substantially continuous stream to form a fourth substantially continuous stream, wherein the third substantially continuous stream substantially comprises aqueous fluid, and wherein the fourth substantially continuous stream comprises gel having a second concentration of hydratable material that is substantially less than the first concentration; and utilizing gel from the fourth substantially continuous stream in a well fracturing operation.

The hydratable material may substantially comprise guar. The hydrating fluid and the aqueous fluid may each substantially comprise water.

Substantially continuously combining the second and third substantially continuous streams to form the fourth substantially continuous stream may comprise adjusting a flow rate of at least one of the second and third substantially continuous streams to change the second concentration. Adjusting the flow rate of at least one of the second and third substantially continuous streams may comprise operating a flow control valve. Adjusting the flow rate of at least one of the second and third substantially continuous streams may comprise adjusting operation of an associated pump.

The method may further comprise communicating the fourth substantially continuous stream into a tank before utilizing gel from the fourth substantially continuous stream in the well fracturing operation. In such implementations, the gel from the fourth substantially continuous stream utilized in the well fracturing operation may be obtained from the tank.

The method may further comprise generating turbulence in the second substantially continuous stream before combining the second and third substantially continuous streams.

The method may further comprise generating turbulence in the third substantially continuous stream before combining the second and third substantially continuous streams.

The method may further comprise generating turbulence in the fourth substantially continuous stream.

The method may further comprise transporting a mobile carrier to a wellsite at which the well fracturing operation is performed. The mobile carrier may comprise a frame and a plurality of wheels rotatably coupled to the frame. The mobile carrier may be detachably connectable to a prime mover. The mixer, the enclosed hydrator, and a combiner may be coupled to the frame. The combiner may be operable for substantially continuously combining the second and third substantially continuous streams to form the fourth substantially continuous stream.

The present disclosure also introduces an apparatus comprising: a system operable to form a substantially continuous supply of gel having a first hydratable material concentration for use in a well fracturing operation, wherein the system comprises: a mixer operable to receive and mix hydratable material and aqueous fluid to form a substantially continuous supply of gel having a second hydratable material concentration, wherein the second hydratable material concentration is substantially higher than the first hydratable material concentration; an enclosed tank having an internal flow path traversed by the substantially continuous supply of gel having the second hydratable material concentration during a period of time sufficient to permit a viscosity of the substantially continuous supply of gel having the second hydratable material concentration to increase to a predetermined level; and a diluter operable to dilute the substantially continuous supply of increased viscosity gel having the second hydratable material concentration to substantially continuously supply gel having the first hydratable material concentration.

The system may further comprise a tank operable to receive the substantially continuous supply of gel having the first hydratable material concentration.

The system may further comprise at least one of: a first flow control device operable to control a first flow rate of the substantially continuous supply of increased viscosity gel having the second hydratable material concentration to the diluter; and a second flow control device operable to control a second flow rate of aqueous fluid to the diluter. At least one of the first and second flow control devices may comprise a flow control valve. At least one of the first and second flow control devices may be disposed adjacent the diluter and may comprise a flow-disrupting member operable to generate turbulence of passing fluid flow. The flow-disrupting member may be a substantially circular plate having a central passage. The flow-disrupting member may be selectively rotatable relative to a conduit containing the passing fluid flow. At least one of the first and second flow control devices may comprise a pump operable to meter flow to the diluter.

The system may further comprise: a first pump operable to transfer aqueous fluid from a source of aqueous fluid to the mixer; and a second pump operable to transfer aqueous fluid from the source of aqueous fluid to the diluter for use in diluting the substantially continuous supply of increased viscosity gel having the second hydratable material concentration.

The hydratable material may substantially comprise guar. The hydratable material may comprise a polymer, a synthetic polymer, a galactomannan, a polysaccharide, a cellulose, a clay, or a combination thereof. The aqueous fluid may substantially comprise water.

The enclosed tank may be a first-in-first-out tank having a channelized flow path. The mixer may be further operable to substantially continuously pressurize the substantially continuous supply of gel having the second hydratable material concentration to cause the substantially continuous supply of gel having the second hydratable material concentration to substantially continuously traverse the channelized flow path.

The diluter may comprise having a first passage receiving the substantially continuous supply of increased viscosity gel having the second hydratable material concentration, a second passage receiving a substantially continuous supply of aqueous fluid, and a third passage conducting the substantially continuously supply of gel having the first hydratable material concentration. The diluter may be a piping tee.

The system may further comprise a frame operatively coupled with a plurality of wheels supporting the frame on the ground. In such implementations, the mixer, the enclosed tank, and the diluter may be connected with the frame. The frame may be detachably connected with a prime mover.

The foregoing outlines features of several implementations so that a person having ordinary skill in the art may better understand the aspects of the present disclosure. A person having ordinary skill in the art should appreciate that they may readily use the present disclosure as a basis for designing or modifying other processes and structures for carrying out the same functions and/or achieving the same benefits of the implementations introduced herein. A person having ordinary skill in the art should also realize that such equivalent constructions do not depart from the spirit and scope of the present disclosure, and that they may make various changes, substitutions and alterations herein without departing from the spirit and scope of the present disclosure.

The Abstract at the end of this disclosure is provided to comply with 37 C.F.R. § 1.72(b) to permit the reader to quickly ascertain the nature of the technical disclosure. It is submitted with the understanding that it will not be used to interpret or limit the scope or meaning of the claims.

What is claimed is:

1. A method, comprising:

substantially continuously feeding a hydratable material and a hydrating fluid into a mixer;

in an additive-receiving structure of the mixer, pre-wetting the hydratable material with a pre-wetting portion of the hydrating fluid to form a partial slurry of the hydratable material before feeding the hydratable material and the hydrating fluid into a mixing chamber of the mixer;

substantially continuously operating the mixer to mix the partial slurry of the hydratable material and the hydrating fluid to form a first substantially continuous stream and to pressurize the first substantially continuous stream to pump the first substantially continuous stream through a discharge of the mixer, wherein the first substantially continuous stream comprises a first gel, the first gel including:

a first concentration of the hydratable material; and a first viscosity;

substantially continuously pumping the first substantially continuous stream with the mixer through an enclosed hydrator to form a second substantially continuous stream, wherein the second substantially continuous stream comprises a second gel, the second gel including:

the first concentration of the hydratable material; and a second viscosity that is greater than the first viscosity;

forming concentration slugs in the first substantially continuous stream and pulsing the first substantially continuous stream in the enclosed hydrator with the concentration slugs;

substantially continuously combining the second substantially continuous stream and a third substantially continuous stream to form a fourth substantially continuous stream, wherein the third substantially continuous stream substantially comprises aqueous fluid, and wherein the fourth substantially continuous stream comprises a fourth gel, the fourth gel including a second concentration of the hydratable material that is less than the first concentration; and utilizing the fourth gel from the fourth substantially continuous stream in a well fracturing operation.

2. The method of claim 1, wherein substantially continuously feeding the hydrating fluid into the mixer includes drawing the hydrating fluid into the mixer with a suction force generated by the mixer.

3. The method of claim 1, wherein substantially continuously operating the mixer further includes rejecting air trapped in the hydratable material with the mixer to discharge the first substantially continuous stream substantially free of the air.

4. The method of claim 1, further comprising transporting a mobile carrier to a wellsite at which the well fracturing operation is performed, wherein:

the mobile carrier comprises a frame and a plurality of wheels rotatably coupled to the frame;

the mobile carrier is detachably connectable to a prime mover;

the mixer, the enclosed hydrator, and a combiner are coupled to the frame; and the combiner is operable for substantially continuously combining the second and third substantially continuous streams to form the fourth substantially continuous stream.

5. The method of claim 1, comprising generating turbulence in the hydratable material, the hydrating fluid, or both, before mixing the hydratable material and the hydrating fluid to form the first substantially continuous stream.

6. The method of claim 1, comprising generating turbulence in the fourth gel from the fourth substantially continuous stream before utilizing the fourth gel from the fourth substantially continuous stream in the well fracturing operation.

7. The method of claim 1, wherein pre-wetting the hydratable material includes:

injecting the pre-wetting portion of the hydrating fluid into the additive-receiving structure of the mixer to form a wall of fluid along an inner surface of the additive-receiving structure; and feeding the hydratable material into the mixer through the additive-receiving structure.

8. The method of claim 1, further comprising transferring heat to the enclosed hydrator to expedite forming the second substantially continuous stream at the second viscosity.

9. An apparatus, comprising:

a system operable to form a first substantially continuous supply of a first gel having a first hydratable material concentration of a hydratable material for use in a well fracturing operation, wherein the system comprises:

a mixer operable to receive and mix the hydratable material and aqueous fluid to form a second substantially continuous supply of a second gel having a second hydratable material concentration, wherein the second hydratable material concentration is higher than the first hydratable material concentration, wherein the mixer includes:

an additive-receiving structure for receiving the hydratable material and for pre-wetting the hydratable material with the aqueous fluid to form a partial slurry; and a mixing chamber including a stator and a rotor for mixing the partial slurry of the hydratable material with the aqueous fluid to form the second substantially continuous supply of the second gel and for pumping the second substantially continuous supply of the second gel based on pressurizing the substantially continuous supply of the second gel in the mixing chamber;

an enclosed tank having an internal flow path traversed by the second substantially continuous supply of the second gel having the second hydratable material concentration during a period of time sufficient to permit a viscosity of the second substantially continuous supply of the second gel having the second hydratable material concentration to increase to a predetermined level, resulting in a third substantially continuous supply of increased viscosity gel, wherein pumping of the second substantially continuous supply of the second gel by the mixer supplies a motive force for the second substantially continuous supply of the second gel to traverse the internal flow path of the enclosed tank for the period of time to form the third continuous supply of the increased viscosity gel;

a diluter operable to dilute the substantially continuous supply of increased viscosity gel having the second hydratable material concentration to generate the first substantially continuously supply of the first gel having the first hydratable material concentration; and at least one of a first flow control device and a second flow control device, wherein the first flow control device is operable to control a first flow rate of the third substantially continuous supply of increased viscosity gel having the second hydratable material concentration to the diluter, wherein the second flow control device is operable to control a second flow rate of aqueous fluid to the diluter, wherein at least one of the first and second flow control devices is disposed adjacent the diluter and comprises a flow-disrupting member operable to generate turbulence of a passing fluid flow, wherein the flow-disrupting member is a substantially circular plate having a central passage, and wherein the flow-disrupting member is selectively rotatable relative to a conduit containing the passing fluid flow.

10. The apparatus of claim 9, wherein the enclosed tank is a first-in-first-out tank having a channelized flow path, and wherein the mixer is further operable to substantially continuously pressurize the second substantially continuous supply of the second gel having the second hydratable material concentration to cause the second substantially continuous supply of the second gel having the second hydratable material concentration to substantially continuously traverse the channelized flow path.

11. The apparatus of claim 9, wherein the system further comprises a frame operatively coupled with a plurality of wheels supporting the frame on the ground, wherein the mixer, the enclosed tank, and the diluter are connected with the frame.

12. The apparatus of claim 9, wherein the mixer receives a continuous stream of the hydratable material from a hydratable material transfer device.

13. The apparatus of claim 9, wherein a discharge pressure of the mixer forces the second substantially continuous supply of the second gel through the enclosed tank.

14. The apparatus of claim 9, wherein:
the hydratable material comprises guar; and
the aqueous fluid comprises water.

15. The apparatus of claim 9, wherein the system utilizes a controller to:
receive, via a plurality of sensors, concentration data relating to the second substantially continuous supply of the second gel having the second hydratable material concentration.

16. An apparatus, comprising:
a system operable to form a substantially first continuous supply of a first gel having a first hydratable material concentration of a hydratable material for use in a well fracturing operation, wherein the system comprises:

a mixer operable to receive and mix the hydratable material and aqueous fluid to form a second substantially continuous supply of a second gel having a second hydratable material concentration, wherein the second hydratable material concentration is higher than the first hydratable material concentration;

an enclosed tank having an internal flow path traversed by the second substantially continuous supply of the second gel having the second hydratable material concentration during a period of time sufficient to permit a viscosity of the second substantially continuous supply of the second gel having the second hydratable material concentration to increase to a predetermined level to generate a third substantially continuous supply of increased viscosity gel having the second hydratable material concentration;

a diluter operable to dilute the third substantially continuous supply of increased viscosity gel having the second hydratable material concentration to generate the first substantially continuously supply of the first gel having the first hydratable material concentration;

a first flow control device operable to control a first flow rate of the third substantially continuous supply of increased viscosity gel having the second hydratable material concentration to the diluter; and a second flow control device operable to control a second flow rate of aqueous fluid to the diluter;

wherein at least one of the first flow control device or the second flow control device is disposed adjacent the diluter and comprises a flow-disrupting member operable to generate turbulence of a passing fluid flow, the flow-disrupting member being a substantially circular plate having a central passage and being selectively rotatable relative to a conduit containing the passing fluid flow.

*    *    *    *    *